United States Patent
Zhou et al.

(10) Patent No.: US 11,584,006 B2
(45) Date of Patent: Feb. 21, 2023

(54) INTELLIGENT ROBOT CONTROL METHOD, APPARATUS, AND SYSTEM, AND STORAGE MEDIUM

(71) Applicant: TENCENT TECHNOLOGY (SHENZHEN) COMPANY LIMITED, Shenzhen (CN)

(72) Inventors: Wei Zhou, Shenzhen (CN); Wei Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 264 days.

(21) Appl. No.: 16/888,628

(22) Filed: May 29, 2020

(65) Prior Publication Data

US 2020/0290202 A1    Sep. 17, 2020

Related U.S. Application Data

(63) Continuation of application No. PCT/CN2019/073877, filed on Jan. 30, 2019.

(30) Foreign Application Priority Data

Feb. 5, 2018 (CN) .......................... 201810113916.6

(51) Int. Cl.
*B25J 9/16* (2006.01)
*B25J 19/00* (2006.01)
*B25J 19/02* (2006.01)

(52) U.S. Cl.
CPC ............. *B25J 9/1664* (2013.01); *B25J 9/161* (2013.01); *B25J 9/1661* (2013.01); *B25J 9/1697* (2013.01); *B25J 19/005* (2013.01); *B25J 19/022* (2013.01)

(58) Field of Classification Search
CPC ........ B25J 9/1664; B25J 9/161; B25J 9/1661; B25J 9/1697; B25J 19/005; B25J 19/022;
(Continued)

(56) References Cited

U.S. PATENT DOCUMENTS 9,701,012 B1 *   7/2017   Theobald .......... G05B 19/41815
9,939,814 B1 *   4/2018   Bauer .................. G05D 1/0285
(Continued)

FOREIGN PATENT DOCUMENTS

CN   103576686 A   2/2014
CN   204965564 U   1/2016
(Continued)

OTHER PUBLICATIONS

The World Intellectual Property Organization (WIPO) International Search Report for PCT/CN2019/073877 dated Apr. 10, 2019 7 Pages (including translation).
(Continued)

*Primary Examiner* — Abby Y Lin
*Assistant Examiner* — Esvinder Singh
(74) *Attorney, Agent, or Firm* — Anova Law Group, PLLC

(57) ABSTRACT

An intelligent robot control method is provided for an intelligent robot. The method includes obtaining a first position at which the intelligent robot is currently located and a target position to be reached, and determining a movement path from the first position to the target position. The movement path has a particular roadblock. The method also includes transmitting a removal request when the intelligent robot moves from the first position to a second position, and a distance between the second position and a third position at which the particular roadblock is located and that is to be reached reaches a target distance. The removal request is used for requesting a removal instruction
(Continued)

to be transmitted to the particular roadblock, and the removal instruction is used for, based on a roadblock type of the particular roadblock, instructing to remove the particular roadblock before the intelligent robot arrives.

17 Claims, 9 Drawing Sheets

(58) Field of Classification Search
CPC ........ B25J 9/1666; B25J 9/1676; B25J 9/162; B25J 5/007; B64C 39/024; B64C 2201/123; B64C 2201/127; G05D 1/0282; G05D 1/101; G05D 2201/0207; G05D 1/0221; G05D 1/0223; G05D 1/024; G05D 1/0285; G05D 2201/02; G05D 1/0033; G05D 1/0044; G05D 1/0088; G05D 1/0212; G05D 1/0214; G05D 1/0248
See application file for complete search history.

(56) References Cited

U.S. PATENT DOCUMENTS

| | | | | |
|---|---|---|---|---|
| 10,857,679 | B1* | 12/2020 | Cousins | ................ B25J 9/1666 |
| 11,099,562 | B1* | 8/2021 | Ebrahimi Afrouzi | ........................ G05D 1/0225 |
| 2004/0049877 | A1 | 3/2004 | Jones et al. | |
| 2011/0144850 | A1 | 6/2011 | Jikihara | |
| 2017/0349402 | A1* | 12/2017 | Chapman | ............... G06Q 10/02 |
| 2019/0185291 | A1* | 6/2019 | Larmuseau | ......... H04W 52/283 |
| 2019/0204844 | A1* | 7/2019 | Lau | ....................... G05D 1/0276 |
| 2019/0235490 | A1* | 8/2019 | Tsusaka | ............... G05D 1/0044 |
| 2020/0061839 | A1* | 2/2020 | Deyle | .................. G06Q 10/087 |
| 2020/0072619 | A1* | 3/2020 | Fukui | ................... G05D 1/0088 |
| 2020/0378927 | A1* | 12/2020 | Nishizawa | ............. B64D 47/08 |

FOREIGN PATENT DOCUMENTS

| | | |
|---|---|---|
| CN | 106228656 A | 12/2016 |
| CN | 106597997 A | 4/2017 |
| CN | 107203214 A | 9/2017 |
| CN | 107315412 A | 11/2017 |
| CN | 107564144 A | 1/2018 |
| CN | 108002154 A | 5/2018 |
| CN | 108415424 A | 8/2018 |
| JP | 2002047861 A | 2/2002 |
| WO | 0068882 A1 | 11/2000 |

OTHER PUBLICATIONS

The State Intellectual Property Office of the People's Republic of China (SIPO) Office Action 1 for 201810113916.6 dated May 13, 2019 15 Pages (including translation).
The European Patent Office (EPO) The Extended European Search Report for 19746964.6 dated Jun. 25, 2021 7 Pages.

* cited by examiner

US 11,584,006 B2

INTELLIGENT ROBOT CONTROL METHOD, APPARATUS, AND SYSTEM, AND STORAGE MEDIUM

RELATED APPLICATIONS

This application is a continuation application of PCT Patent Application No. PCT/CN2019/073877, filed on Jan. 30, 2019, which claims priority to Chinese Patent Application No. 2018101139166, filed with the Chinese Patent Office on Feb. 5, 2018 and entitled "INTELLIGENT ROBOT CONTROL METHOD, APPARATUS, AND SYSTEM, AND STORAGE MEDIUM", content of all of which is incorporated herein by reference in its entirety.

FIELD OF THE TECHNOLOGY

This application relates to the field of computer technologies and, specifically, to an intelligent robot control method, apparatus, and system, and a storage medium.

BACKGROUND

Nowadays, more intelligent robots are used in real life to do some simple and repetitive work. For example, some intelligent robots used in a process of autonomous inspection to replace manual inspection, so as to improve inspection efficiency.

However, in a process of autonomous inspection, an intelligent robot often encounters some special roadblocks, such as an entrance guard or an elevator. To continue to complete the inspection, the intelligent robot requires the entrance guard to be removed or needs to enter the elevator to go to another floor. The intelligent robot usually passes through such special roadblocks in the following manners: (1) The intelligent robot is controlled, based on near field data communication, to pass through. For example, a near field data communications device is disposed at the entrance guard, and the entrance guard may be removed only after it is detected that the intelligent robot has reached a specified position, to enable the intelligent robot to pass through. (2) The intelligent robot is controlled, based on an operation performed by a mechanical arm, to pass through. For example, the entrance guard may be removed or the elevator may be started only after the mechanical arm accurately touches a corresponding button, to enable the intelligent robot to pass through.

However, when the intelligent robot passes through such special roadblocks, the intelligent robot further needs to be controlled to wait at a specified position for a period of time, until the intelligent robot reaches an accurate specified position, or an accurate button is touched. In other words, a control method provided in the related art has a problem of relatively low efficiency in controlling an intelligent robot.

The disclosed methods and systems are directed to solve one or more problems set forth above and other problems.

SUMMARY

Embodiments of the present disclosure provide an intelligent robot control method, apparatus, and system, and a storage medium, to resolve at least a technical problem of relatively low efficiency in controlling an intelligent robot in a control method provided in the related art.

According to an aspect of the present disclosure, an intelligent robot control method is provided for an intelligent robot. The method includes obtaining a first position at which the intelligent robot is currently located and a target position to be reached by the intelligent robot; determining a movement path from the first position to the target position, the movement path having a particular roadblock; and transmitting a removal request when the intelligent robot moves from the first position to a second position, and a distance between the second position and a third position at which the particular roadblock is located and that is to be reached reaches a target distance. The removal request is used for requesting a removal instruction to be transmitted to the particular roadblock at the third position, and the removal instruction is used for, based on a roadblock type of the particular roadblock, instructing to remove the particular roadblock at the third position before the intelligent robot arrives.

According to another aspect of the present disclosure, an intelligent robot control method is further provided for a control server. The method includes obtaining a removal request transmitted by an intelligent robot. The intelligent robot moves from a first position to a target position according to a movement path; and triggers the removal request in a case that the intelligent robot moves from the first position to a second position, and a distance between the second position and a third position at which a particular roadblock is located and that is to be reached by the intelligent robot reaches a target distance. The method also includes transmitting a removal instruction to the particular roadblock at the third position according to the removal request. The removal instruction is used for, based on a roadblock type of the particular roadblock, instructing to remove the particular roadblock at the third position before the intelligent robot arrives.

According to another aspect of the present disclosure, an intelligent robot is further provided. The intelligent robot includes a battery pack for supplying power to the intelligent robot; a memory for storing computer programs; and a processor coupled to the memory for executing the computer programs. When executing the computer programs, the processor is configured to perform: obtaining a first position at which the intelligent robot is currently located and a target position to be reached by the intelligent robot; determining a movement path from the first position to the target position, the movement path having a particular roadblock; and transmitting a removal request when the intelligent robot moves from the first position to a second position, and a distance between the second position and a third position at which the particular roadblock is located and that is to be reached reaches a target distance. The removal request is used for requesting a removal instruction to be transmitted to the particular roadblock at the third position, and the removal instruction is used for, based on a roadblock type of the particular roadblock, instructing to remove the particular roadblock at the third position before the intelligent robot arrives.

Other aspects of the present disclosure can be understood by those skilled in the art in light of the description, the claims, and the drawings of the present disclosure.

BRIEF DESCRIPTION OF THE DRAWINGS

The accompanying drawings described herein are used to provide a further understanding of the present disclosure, and form part of the present disclosure. The drawings are used to explain the present disclosure, and do not constitute any inappropriate limitation to the present disclosure. In the accompanying drawings.

DETAILED DESCRIPTION

The following describes the technical solutions in the embodiments of the present disclosure with reference to the accompanying drawings in the embodiments of the present disclosure. Apparently, the described embodiments are merely some but not all of the embodiments of the present disclosure. Other embodiments obtained by a person of ordinary skill in the art based on the described embodiments of the present disclosure without creative efforts shall fall within the protection scope of the present disclosure.

In the present disclosure, terms such as "first" and "second" are used for differentiating similar objects, and are not necessarily used for describing a particular sequence or an order. It is to be understood that the data termed in such a way are interchangeable in proper circumstances, so that the embodiments of the present disclosure described herein can be implemented in other orders than the order illustrated or described herein. Moreover, the terms "include", "contain" and any other variations mean to cover the non-exclusive inclusion, for example, a process, method, system, product, or device that includes a list of steps or units is not necessarily limited to those units, but may include other units not expressly listed or inherent to such a process, method, system, product, or device.

Figure 1:
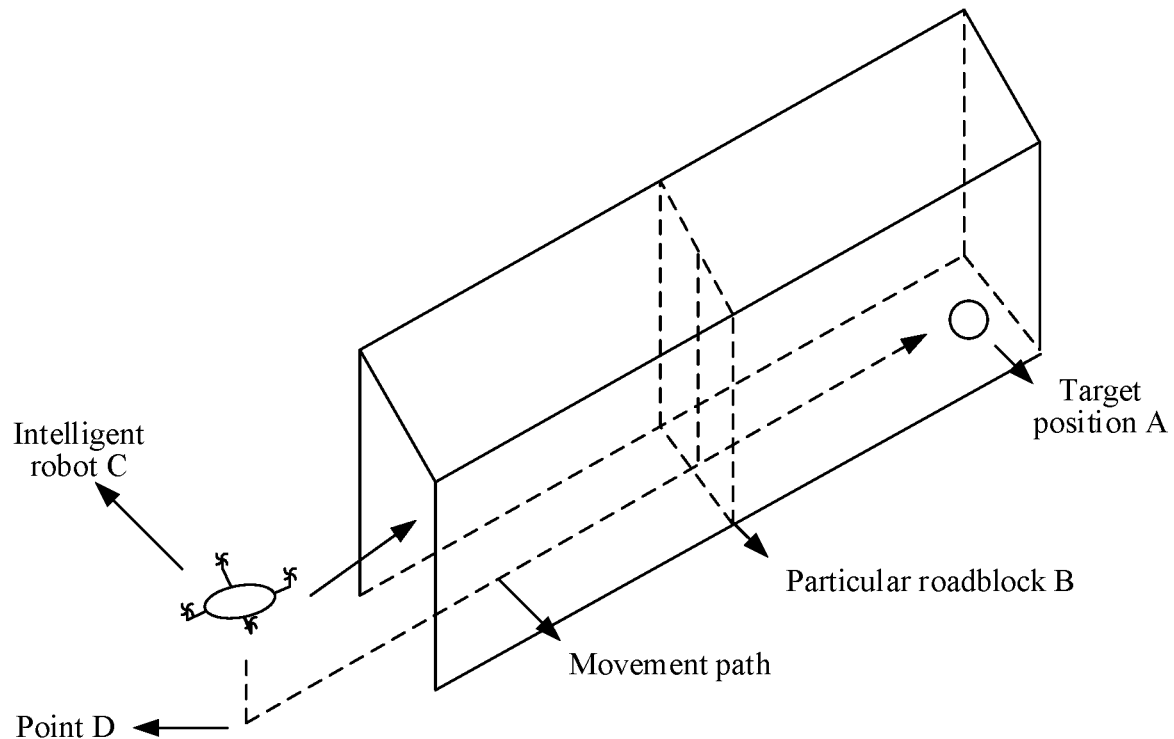
FIG. 1 is a schematic diagram of an application environment of an optional intelligent robot control method according to an embodiment of the present disclosure.

According to an aspect of the embodiments of the present disclosure, an intelligent robot control method is provided. The method may be applied to an application environment shown in FIG. 1. As shown in FIG. 1, the application environment includes a corridor, an intelligent robot C, and a target position A. A particular roadblock B is between the intelligent robot C and the target position A.

The particular roadblock B in FIG. 1 is a controllable electronic door, for example. The target position A to be reached by the intelligent robot C is obtained. A movement path of the intelligent robot C is determined according to the target position A and a first position D in which the intelligent robot C is located. As shown in FIG. 1, an arrow between the intelligent robot C and the target position A in FIG. 1 represents the movement path. A distance between the first position D of the intelligent robot C and the particular roadblock B is detected. In a case that the distance reaches a target distance, the intelligent robot transmits a removal request, so that the particular roadblock B is removed before the intelligent robot C arrives. FIG. 1 indicates that the electronic door (as roadblock B) is open before the intelligent robot C arrives, for the intelligent robot C to pass through.

Optionally, the intelligent robot control method may be applied to a hardware device. The hardware device may include a control module disposed inside the intelligent robot, or a control device disposed outside the intelligent robot. The control device disposed outside the intelligent robot and the intelligent robot may have the following connection relationship: a physically wired connection to the intelligent robot, or a wireless communication connection to the intelligent robot through near field communication or a wireless network.

Figure 2:
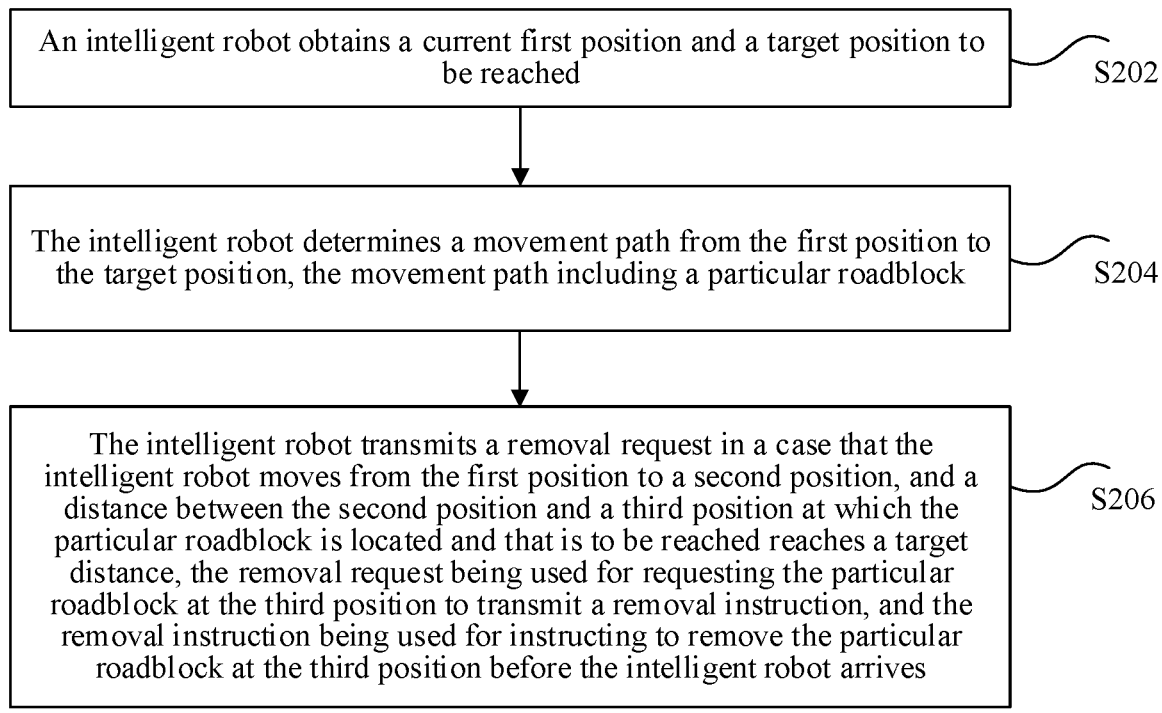
FIG. 2 is a schematic flowchart of an intelligent robot control method according to an embodiment of the present disclosure.

As shown in FIG. 2, the intelligent robot control method may include the followings.

S202. An intelligent robot obtains a first position at which the intelligent robot is currently located and a target position to be reached.

S204. The intelligent robot determines a movement path from the first position to the target position, the movement path including a particular roadblock.

S206. The intelligent robot transmits a removal request in a case that the intelligent robot moves from the first position to a second position, and a distance between the second position and a third position at which the particular roadblock is located and that is to be reached reaches a target distance, the removal request being used for requesting the particular roadblock at the third position to transmit a removal instruction, and the removal instruction being used for instructing to remove the particular roadblock at the third position before the intelligent robot arrives.

Optionally, the intelligent robot control method may be applied to a scenario of controlling an intelligent robot to patrol an area, or using an intelligent robot to deliver goods. Optionally, the intelligent robot control method may be applied to the Internet-of-Things control system. The Internet-of-Things control system may include, but is not limited to including: an intelligent robot, a particular roadblock, and a control server configured to control removal of the particular roadblock. The Internet-of-Things control system may be, but is not limited to, a control subnetwork included in the Internet-of-Things. The Internet-of-Things may be, but is not limited to, an information carrier such as the Internet or a conventional telecommunications network, or a network enabling all ordinary objects that can perform independent functions to achieve interconnection. In other words, the intelligent robot, the particular roadblock, and the control server described in this embodiment are equivalent to some objects included in the Internet-of-Things.

For example, in a patrol scenario, the particular roadblock may be a controllable electronic door. In this application scenario, the intelligent robot obtains, from the control server, a target position to be reached by the intelligent robot, and determines a movement path according to a position at which the intelligent robot is currently located. When the movement path includes the electronic door, the intelligent robot transmits a removal request to the control server when a distance from the intelligent robot to the particular roadblock reaches a target distance, to request to control the electronic door to open. When the intelligent robot reaches the electronic door, the electronic door is open, and the intelligent robot may pass through the electronic door without staying or stopping.

In one embodiment, a method is used, in which an intelligent robot obtains a first position at which the intelligent robot is currently located and a target position to be reached, and the intelligent robot determines a movement path, the movement path including a particular roadblock. In addition, a distance between the intelligent robot and the particular roadblock on the movement path is detected after the movement path is determined, and a removal request is transmitted in advance in a case that the distance between the intelligent robot and the particular roadblock reaches a target distance, to remove particular roadblock, so that the intelligent robot may directly pass through the removed particular roadblock on the movement path without needing to spend time waiting when the intelligent robot reaches the particular roadblock, thereby improving efficiency in controlling the intelligent robot by reducing a time taken by the intelligent robot to pass through the particular roadblock.

Optionally, the intelligent robot may include an intelligent robot that can move, such as a flying robot or a land robot.

Figure 3:
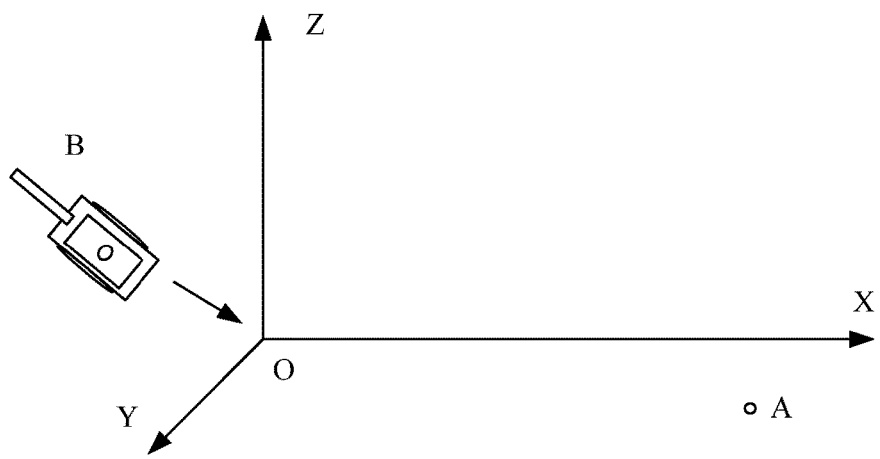
FIG. 3 is a schematic diagram of another intelligent robot control method according to an embodiment of the present disclosure.

Optionally, the target position may be a manually selected target position, or a target position automatically selected by the intelligent robot. For example, the target position may be obtained by using a method of establishing a three-dimensional coordinate system. As shown in FIG. 3, the intelligent robot B is a tank, and a current position of the tank B is used as an origin to establish a three-dimensional coordinate system. A(20, 5, 0) in the three-dimensional coordinate system is selected as the target position. The foregoing description is merely an example, and does not constitute any limitation on the present disclosure.

Optionally, the movement path may include a straight line or a continuous curve.

Optionally, the distance between the current position of the intelligent robot and the particular roadblock to be reached is a length of the movement path of the intelligent robot.

Optionally, before the intelligent robot is controlled to transmit a removal request, the following processes are further included: obtaining, by the intelligent robot, a movement speed of the intelligent robot and a control removal time matching the particular roadblock, the control removal time being used for indicating a time used for removing the particular roadblock before the intelligent robot arrives; and obtaining, by the intelligent robot, the target distance according to the movement speed and the control removal time.

Optionally, after obtaining the time used for removing the particular roadblock, the intelligent robot obtains the target distance according to a product of the movement speed of the intelligent robot and the time used for removing the particular roadblock.

Optionally, in order that the particular roadblock is removed when the intelligent robot reaches the particular roadblock, after the target distance is obtained, a fluctuation value is added to the target distance to obtain a new target distance, and the target distance is used to instruct the intelligent robot to transmit the removal request. In this way, the particular roadblock is removed before the intelligent robot reaches the particular roadblock. The fluctuation value is a positive number, and a specific value may be set according to an actual situation.

Optionally, the movement speed of the intelligent robot is not uniform, and an average speed of the intelligent robot within a period of time is selected as the movement speed.

Optionally, whether the movement path includes the particular roadblock may be determined in the following manners:

If an intersection exists between the movement path and an identifier of a particular roadblock on a map, the movement path includes the particular roadblock. If no intersection exists between the movement path and an identifier of a particular roadblock on a map, the movement path does not include the particular roadblock.

Optionally, the control removal time may be a time taken from receipt of the removal request to completion of removal.

Optionally, that the intelligent robot transmits the removal request to the Internet-of-Things includes: The intelligent robot determines a roadblock type of the particular roadblock. The intelligent robot transmits the removal request to the control server in the Internet-of-Things according to the roadblock type of the particular roadblock. The control server in the Internet-of-Things transmits a removal instruction matching the roadblock type of the particular roadblock to the particular roadblock according to the roadblock type, to remove the particular roadblock, and transmits a removal response to the intelligent robot.

Optionally, the removal response includes a removal result of the particular roadblock. After receiving the removal result, the intelligent robot may adjust a to-be-executed action according to the removal result.

Optionally, the removal result may be that the particular roadblock has been removed, or that the particular roadblock is not removed. When the particular roadblock has been removed, the intelligent robot may be controlled to continue moving according to the movement path. When the particular roadblock is not removed, the intelligent robot may be controlled to pause movement and wait or update the movement path. The updated movement path bypasses the particular roadblock that cannot be removed.

Optionally, the intelligent robot alarms after receiving the removal result of the particular roadblock that is not removed.

Optionally, the type of the particular roadblock may include a first type and a second type. When the roadblock type is the first type, the control server transmits a first removal instruction to the particular roadblock whose roadblock type is the first type, the first removal instruction being used for causing the particular roadblock to open. When the roadblock type is the second type, the control server transmits a second removal instruction to the particular roadblock whose roadblock type is the second type, the second removal instruction being used for causing the particular roadblock whose roadblock type is the second type to move, within a predetermined time period, to a first floor on which the intelligent robot is located.

Optionally, before the movement path on which the intelligent robot moves to the target position is determined according to the target position and the current position of the intelligent robot, the following steps are further included: obtaining, by the intelligent robot, environment scanning data of the current position of the intelligent robot through laser scanning; comparing the environment scanning data with an environment map; and determining the current position of the intelligent robot according to a comparison result.

Optionally, a three-dimensional coordinate system may be set according to the environment map. In this case, each position on the environment map has corresponding coordinates in the three-dimensional coordinate system.

In one embodiment of the present disclosure, the intelligent robot obtains the target position to be reached and the first position of the intelligent robot, determines the movement path on which the intelligent robot moves to the target position, and obtains the distance for the intelligent robot to reach the particular roadblock on the movement path. When the distance reaches the target distance, the intelligent robot is controlled to transmit the removal request, to remove the particular roadblock, so that the intelligent robot is prevented from waiting in front of the particular roadblock, thereby improving efficiency in controlling the intelligent robot.

In one embodiment, the intelligent robot transmits the removal request to the Internet-of-Things, including the followings.

S1. The intelligent robot determines a roadblock type of the particular roadblock at the third position.

S2. The intelligent robot transmits the removal request to a control server in the Internet-of-Things, the removal request carrying the roadblock type, and the control server being configured to transmit the removal instruction matching the roadblock type to the particular roadblock at the third position according to the removal request.

Optionally, the roadblock type of the particular roadblock may be preset to for example, the first type or the second type.

Figure 4:
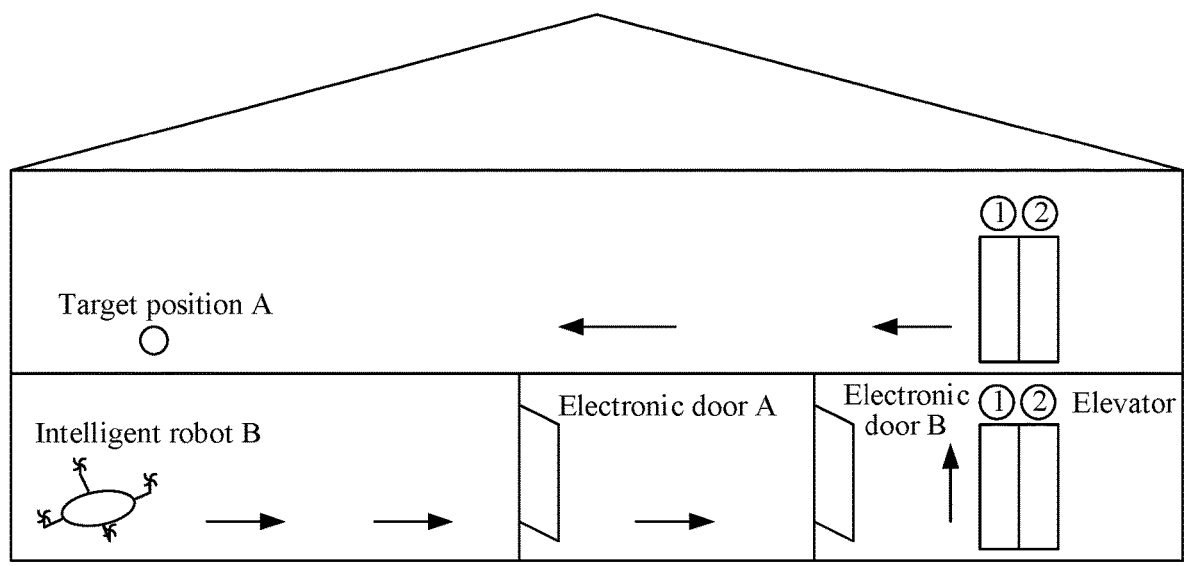
FIG. 4 is a schematic diagram of another intelligent robot control method according to an embodiment of the present disclosure.

Details are described with reference to FIG. 4. As shown in FIG. 4, which includes an electronic door A, an electronic door B, and an elevator, the electronic door A and the electronic door B may be of the first type, and the elevator may be of the second type. After detecting the electronic door A, the electronic door B, and the elevator on the movement path during movement, the intelligent robot B transmits a removal request to the control server. Then, the control server transmits removal instructions matching the types of the particular roadblocks according to the types of the particular roadblocks, for example, a first removal instruction used for opening an electronic door, and a second removal instruction used for opening an elevator.

The first removal instruction used for opening an electronic door and the second removal instruction used for opening an elevator are merely an example, which is not specifically limited here.

In one embodiment, different removal instructions are set according to types of particular roadblocks, so that a time for removing a particular roadblock is more accurate, thereby avoiding a problem of inaccurate time for removing a particular roadblock due to a case that types of particular roadblocks are different but removal instructions are the same.

In one embodiment, after the transmitting, by the intelligent robot, the removal request to a control server in the Internet-of-Things, the following steps are further included:

S1. The intelligent robot obtains a removal response transmitted by the control server, the removal response being used for indicating a removal result of the particular roadblock at the third position.

S2. The intelligent robot adjusts a to-be-executed action according to the removal result.

Optionally, the removal result of the particular roadblock may be that the removal of the particular roadblock succeeds, or that the removal of the particular roadblock fails. The to-be-executed action may be waiting, or updating the movement path, or continuing moving.

Adjusting a to-be-executed action of the intelligent robot according to the removal result includes the followings.

S1. The intelligent robot continues moving according to the movement path, and passes through the particular roadblock at the third position, in a case that the removal result indicates that the particular roadblock at the third position has been removed.

S2. The intelligent robot executes at least one of the following actions in a case that the removal result indicates that the particular roadblock at the third position is not removed: the intelligent robot pausing movement, and retransmitting the removal request to the control server; and the intelligent robot updating the movement path, the updated movement path bypassing the particular roadblock at the third position.

Figure 5:
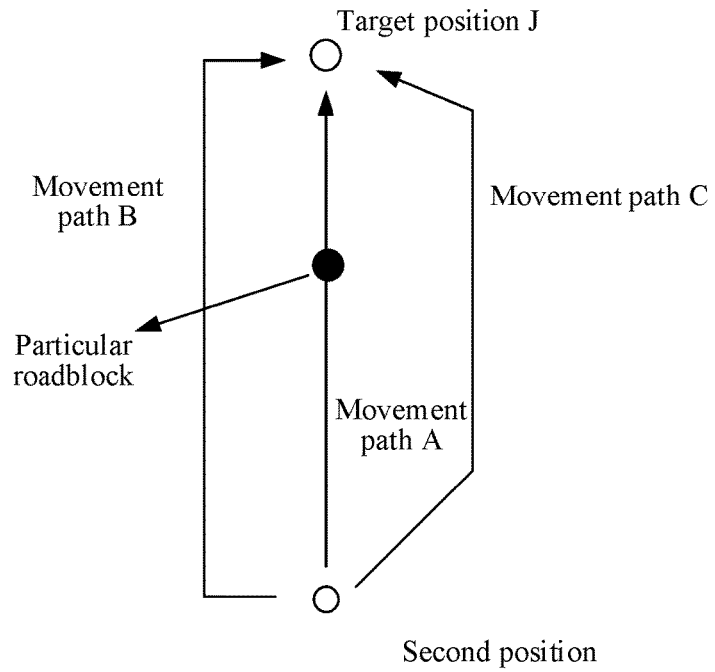
FIG. 5 is a schematic diagram of another intelligent robot control method according to an embodiment of the present disclosure.

For example, descriptions are provided with reference to FIG. 5. When the intelligent robot is at the second position, the intelligent robot obtains that a distance between the second position and a target position J reaches the target distance. In this case, the intelligent robot transmits a removal request to the control server, to request to remove a particular roadblock on a movement path A. The control server transmits, to the intelligent robot, a removal result indicating that the roadblock is normally removed. In this case, the intelligent robot continues moving along the movement path A. If the control server transmits, to the intelligent robot, a removal result indicating that the roadblock cannot be removed, the intelligent robot updates the movement path according to the second position and the target position J. An updated movement path is a movement path B or a movement path C that is different from the movement path A. The particular roadblock that cannot be removed is not on the movement path B or the movement path C. The intelligent robot moves according to the updated movement path B or the updated movement path C.

In one embodiment, the movement path is updated in a case that the particular roadblock cannot be removed, the updated movement path bypassing the particular roadblock at the third position, thereby avoiding a case in which the intelligent robot cannot continue moving because the particular roadblock cannot be removed, and improving efficiency in controlling the intelligent robot.

In one embodiment, after the transmitting the removal request to a control server in the Internet-of-Things, the following steps are further included.

S1. The control server transmits a first removal instruction to the particular roadblock at the third position in a case that the roadblock type is indicated as a first type, the first removal instruction being used for instructing the particular roadblock at the third position to execute an open action.

S2. The control server transmits a second removal instruction to the particular roadblock at the third position in a case that the roadblock type is indicated as a second type, the second removal instruction being used for instructing the particular roadblock at the third position to move, within a predetermined time period, to a first floor on which the intelligent robot is located.

For example, descriptions are still provided with reference to FIG. 4. As shown in FIG. 4, when the roadblock type of the particular roadblock is an electronic door, the control server transmits the first removal instruction that causes the electronic door to open. When the roadblock type of the particular roadblock is an elevator, the control server transmits the second removal instruction, to instruct the elevator to move to a first floor on which the intelligent robot is located, and open a door of the elevator.

In one embodiment of the present disclosure, different types of particular roadblocks are removed by using different removal instructions, so that efficiency in removing a particular roadblock is improved, thereby improving efficiency in controlling the intelligent robot.

In one embodiment, after the transmitting, by the control server, a second removal instruction to the particular roadblock at the third position, or during the transmitting a second removal instruction to the particular roadblock at the third position, the following steps are further included.

S1. The intelligent robot transmits an inter-floor movement instruction to the control server, the inter-floor movement instruction being used for indicating a second floor to be reached by the intelligent robot.

S2. The intelligent robot obtains, after the particular roadblock at the third position moves to the second floor, an inter-floor movement response returned by the control server, the inter-floor movement response being used for instructing the intelligent robot to continue moving on the second floor according to the movement path.

Figure 6:
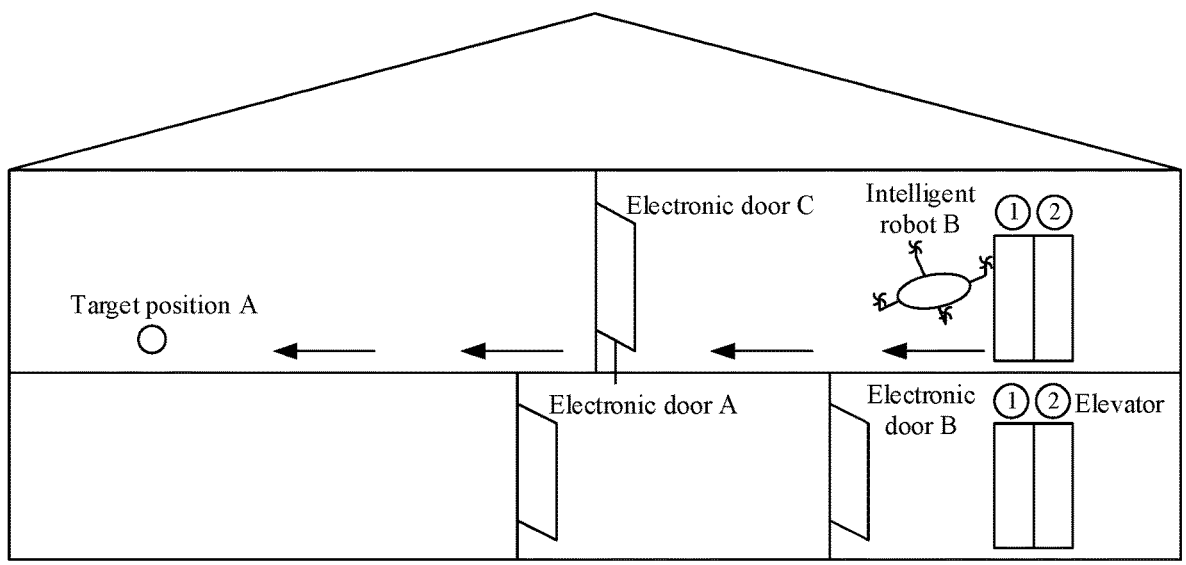
FIG. 6 is a schematic diagram of another intelligent robot control method according to an embodiment of the present disclosure.

For example, descriptions are provided with reference to FIG. 4 and FIG. 6. As shown in FIG. 4, the intelligent robot is located on the first floor. After the intelligent robot moves to the elevator, the intelligent robot takes the elevator to reach a second floor, as shown in FIG. 6. After reaching the second floor, the intelligent robot obtains an inter-floor movement response of the control server. After the inter-floor movement response is obtained, the intelligent robot is controlled according to the inter-floor movement response to continue moving to the target position A on the second floor.

In one embodiment, an inter-floor movement instruction is transmitted to the control server, so that after passing through the particular roadblock of the second type, the intelligent robot may continue moving to the target position, thereby avoiding a problem that the intelligent robot cannot continue moving to the target position after losing the target position.

In one embodiment, before the intelligent robot is controlled to transmit the removal request to the Internet-of-Things, the following steps are further included.

S1. The intelligent robot obtains a control removal time matching the particular roadblock at the third position, the control removal time including a time for removing the particular roadblock at the third position before the intelligent robot arrives.

S2. The intelligent robot determines the target distance according to the control removal time.

The determining, by the intelligent robot, the target distance according to the control removal time includes the following steps.

S21. The intelligent robot obtains a movement speed of the intelligent robot and the control removal time.

S22. The intelligent robot determines the target distance according to a product of the movement speed and the control removal time.

Figure 7:
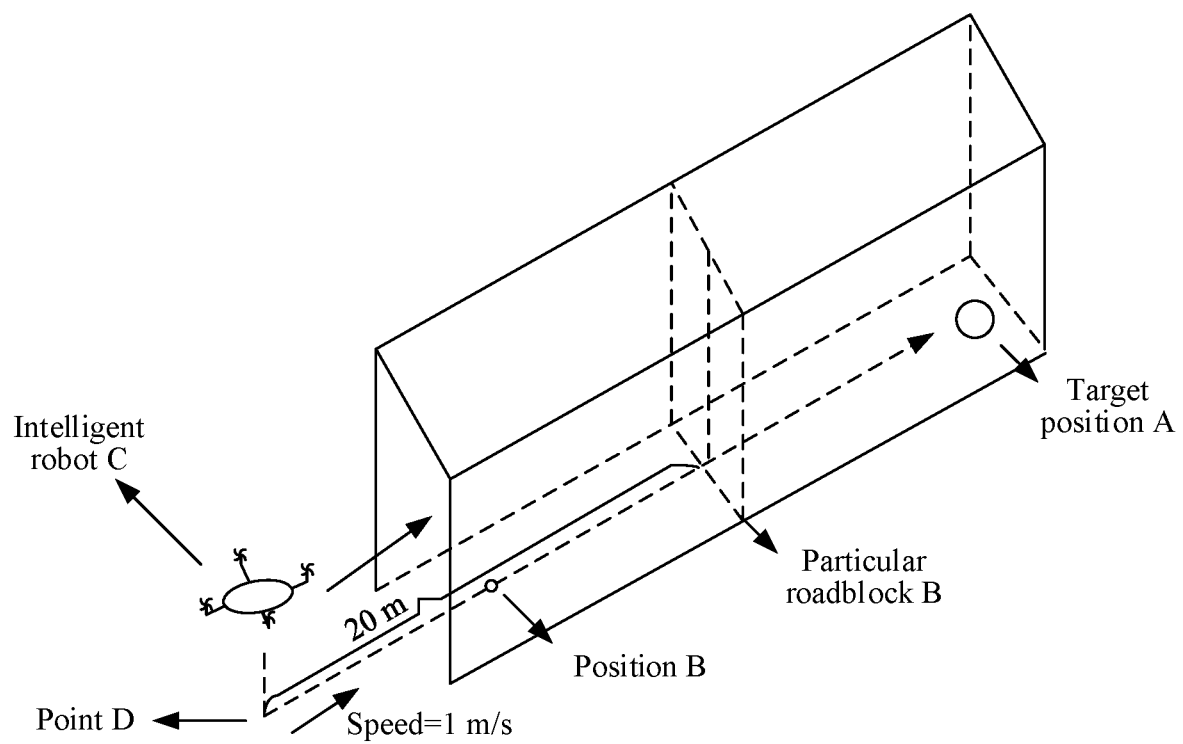
FIG. 7 is a schematic diagram of another intelligent robot control method according to an embodiment of the present disclosure.

For example, as shown in FIG. 7, the intelligent robot C moves from a point D to the target position A, a movement speed is 1 m/s, and the particular roadblock B is an electronic door. A distance from the point D to the point B of the electronic door is 20 m, and a time required from when the electronic door B receives the removal request to when the electronic door B completely opens is 10 s. Therefore, according to the movement speed of the intelligent robot: 1 m/s, and the time required by the electronic door B to completely open: 10 s, it is obtained that the target distance is 10 m. FIG. 7 shows the position B having the distance of 10 m from the particular roadblock B.

In one embodiment of the present disclosure, the movement speed of the intelligent robot is obtained, the target distance is obtained according to the movement speed and a removal control time, and the target position may be accurately determined according to the target distance, so that the target position is more accurately determined, and a problem of untimely removal of the particular roadblock is avoided.

In an embodiment, after the determining, by the intelligent robot, a movement path from the first position to the target position, the following step is further included.

S1. The intelligent robot determines, in a case that an intersection exists between the movement path and a roadblock identifier of a particular roadblock that is included on a map, that the movement path includes the particular roadblock.

Figure 8:
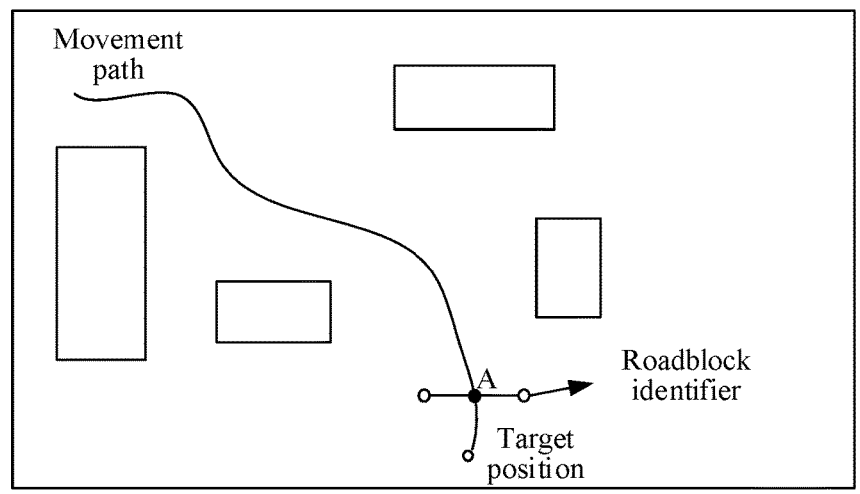
FIG. 8 is a schematic diagram of another intelligent robot control method according to an embodiment of the present disclosure.

Optionally, the roadblock identifier may be an identifier of the particular roadblock on a map. For example, as shown in FIG. 8, a curve in FIG. 8 is the movement path of the intelligent robot, and a roadblock identifier in FIG. 8 is formed by combining two circles and line segments between the two circles. An intersection A exists between the movement path and the roadblock identifier. Therefore, the movement path includes the particular roadblock.

In one embodiment, it is determined whether an intersection exists between the movement path and the roadblock identifier, to determine whether the movement path includes the particular roadblock, so that the particular roadblock is more accurately determined, thereby improving efficiency in controlling the intelligent robot.

In one embodiment, the obtaining, by an intelligent robot, a first position at which the intelligent robot is currently located includes the following steps.

S1. The intelligent robot obtains, through laser scanning, environment scanning data of the intelligent robot at the first position.

S2. The intelligent robot determines the first position according to the environment scanning data.

Figure 9:
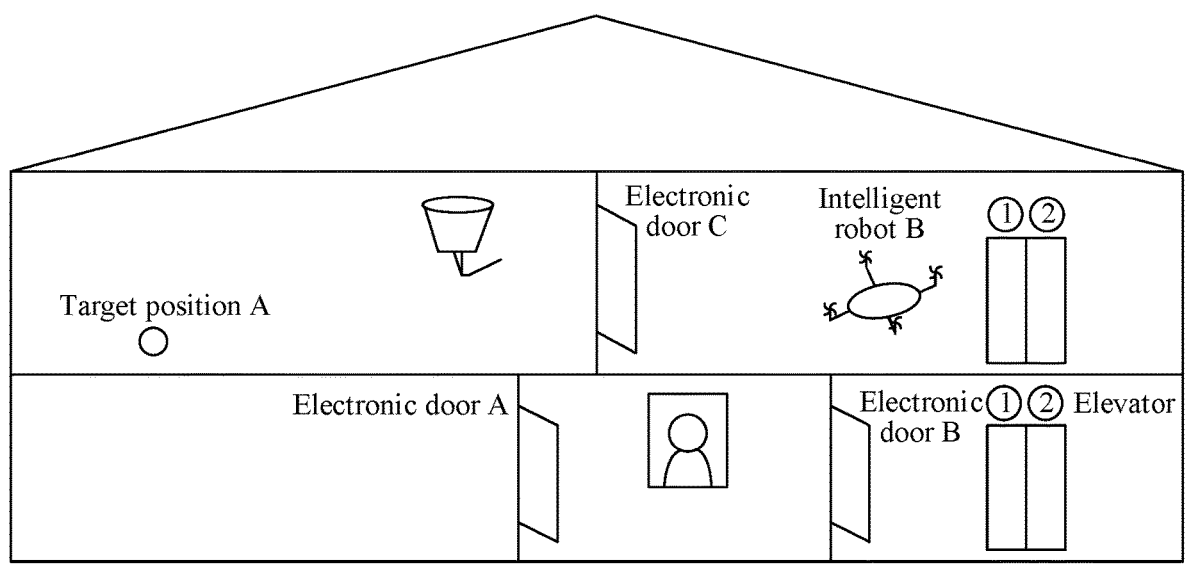
FIG. 9 is a schematic diagram of another intelligent robot control method according to an embodiment of the present disclosure.

For example, as shown in FIG. 9, the intelligent robot B is located at an elevator entrance on the second floor. The intelligent robot B obtains, during movement, surrounding environment scanning data through laser scanning, for example, obtains through scanning that there is an electric light 10 meters away. The intelligent robot B compares the environment scanning data obtained through scanning with the environment map. The environment map pre-stores scanning data corresponding to all places reachable by the intelligent robot. When the electric light obtained by the intelligent robot B through scanning matches the scanning data prestored in the environment map, a position of the intelligent robot that corresponds to the scanning data prestored in the environment map is used as the current position of the intelligent robot.

In one embodiment of the present disclosure, according to the method in which the environment scanning data of the current position of the intelligent robot is obtained through laser scanning and compared with the environment map, so that the current position of the intelligent robot is obtained, the current position of the intelligent robot is accurately obtained.

Figure 10:
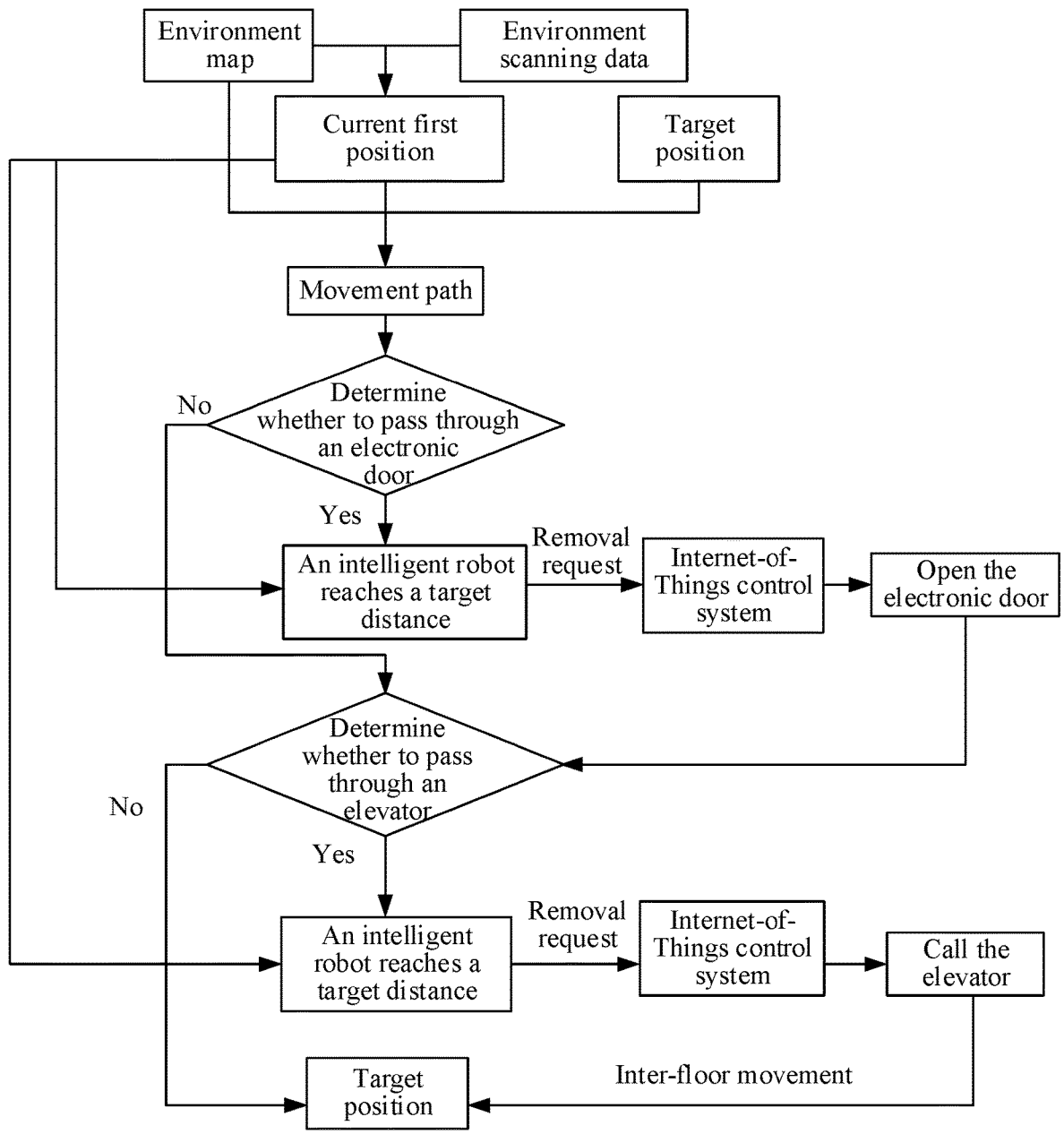
FIG. 10 is a schematic flowchart of another intelligent robot control method according to an embodiment of the present disclosure.

The intelligent robot control method is described in detail with reference to FIG. 10. The intelligent robot obtains a current first position according to the environment map and the environment scanning data by using a positioning algorithm, and obtains the movement path according to the current first position, the environment map, and the target position by using a path planning algorithm. It is determined whether the movement path includes an electronic door. Assuming that the movement path includes an electronic door, the intelligent robot is controlled to transmit a request for opening the electronic door to the control server when the intelligent robot reaches the target distance. The control server opens the electronic door after receiving the request. After the electronic door is open, it is determined whether the intelligent robot is to pass through an elevator. Assuming that the intelligent robot is to pass through the elevator, a request for calling the elevator is transmitted to the control server when the intelligent robot reaches the target distance, to implement inter-floor movement by using the elevator. After the intelligent robot uses the elevator, the intelligent robot is controlled to move to the target position.

For ease of description, the above methods are described as a combination of a series of actions. However, a person of ordinary skill in the art is to know that the present disclosure is not limited to any described sequence of the actions. Some steps can be performed in other sequences or simultaneously according to the present disclosure. Second, a person skilled in the art is to know that the embodiments described in this specification are all optional embodiments and the involved actions and modules are not necessarily required by the present disclosure.

According to another aspect of the embodiments of the present disclosure, an intelligent robot control method is further provided. The intelligent robot control method may be applied to the application environment shown in FIG. 1. For a specific application, refer to the foregoing description. Details are not described herein again.

Optionally, the intelligent robot control method may be applied to a hardware device. The hardware device may be a server having a calculation function, or a control apparatus that may transmit a removal instruction to a particular roadblock. The server or the control apparatus interacts with the intelligent robot or the particular roadblock through a network.

Figure 11:
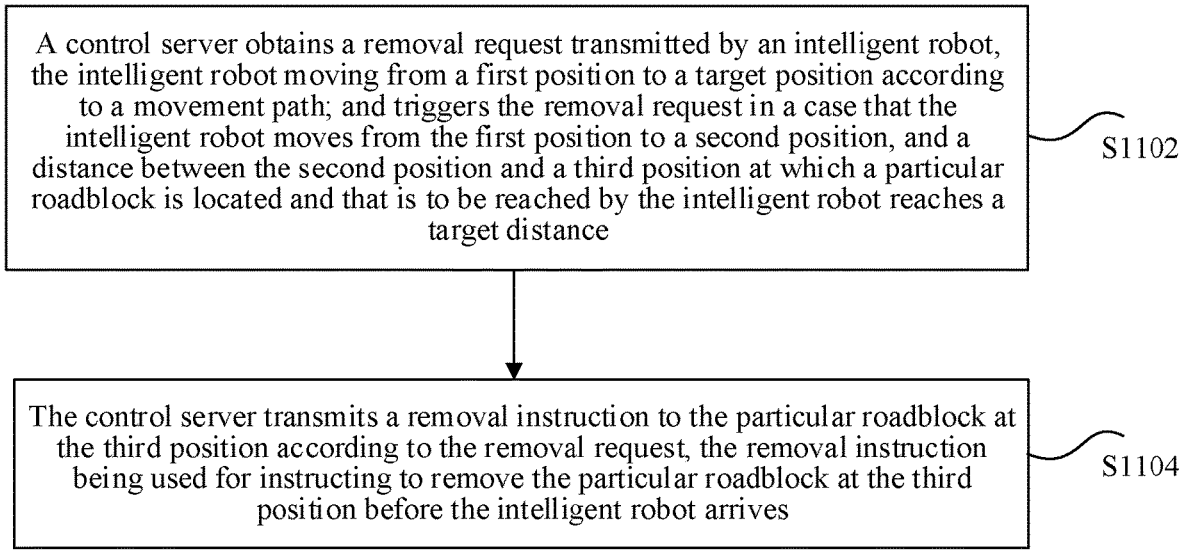
FIG. 11 is a schematic flowchart of another intelligent robot control method according to an embodiment of the present disclosure.

Optionally, in one embodiment, as shown in FIG. 11, the intelligent robot control method may include the followings.

S1102. A control server obtains a removal request transmitted by an intelligent robot, the intelligent robot moving from a first position to a target position according to a movement path; and triggers the removal request in a case that the intelligent robot moves from the first position to a second position, and a distance between the second position and a third position at which a particular roadblock is located and that is to be reached by the intelligent robot reaches a target distance.

S1104. The control server transmits a removal instruction to the particular roadblock at the third position according to the removal request, the removal instruction being used for instructing to remove the particular roadblock at the third position before the intelligent robot arrives.

Optionally, the intelligent robot control method may be applied to a scenario of controlling an intelligent robot to patrol an area, or using an intelligent robot to deliver goods. Optionally, the intelligent robot control method may be applied to the Internet-of-Things control system. The Internet-of-Things control system includes an intelligent robot, a particular roadblock, and a control server configured to control removal of the particular roadblock. The Internet-of-Things control system may be a control subnetwork included in the Internet-of-Things. The Internet-of-Things may be an information carrier such as the Internet or a conventional telecommunications network, or a network enabling all ordinary objects that can perform independent functions to achieve interconnection. In other words, the intelligent robot, the particular roadblock, and the control server described in one embodiment are equivalent to some objects included in the Internet-of-Things.

For example, in a patrol scenario, the particular roadblock may be a controllable electronic door. In the present disclosure scenario, the control server obtains the removal request transmitted by the intelligent robot, the intelligent robot moving from the first position to the target position according to the movement path, and the removal request is triggered in a case that the intelligent robot moves from the first position to the second position, and the distance between the second position and the third position at which the particular roadblock is located and that is to be reached by the intelligent robot reaches the target distance; and after obtaining the removal request transmitted by the intelligent robot, the control server transmits the removal instruction to the particular roadblock at the third position according to the removal request, so that the particular roadblock is removed. In this way, the particular roadblock is removed before the intelligent robot reaches the particular roadblock, thereby preventing the intelligent robot from waiting.

In one embodiment, the control server obtains the removal request transmitted by the intelligent robot, the intelligent robot moving from the first position to the target position according to the movement path, and triggers the removal request in a case that the intelligent robot moves from the first position to the second position, and the distance between the second position and the third position at which the particular roadblock is located and that is to be reached by the intelligent robot reaches the target distance; and the control server transmits the removal instruction to the particular roadblock at the third position according to the removal request after obtaining the removal instruction transmitted by the intelligent robot, so that the particular roadblock is removed, and the intelligent robot may directly pass through the removed particular roadblock on the movement path without needing to spend time waiting when the intelligent robot reaches the particular roadblock, thereby improving efficiency in controlling the intelligent robot by reducing a time taken by the intelligent robot to pass through the particular roadblock.

Optionally, the intelligent robot may include an intelligent robot that can move around, such as a flying robot or a land robot.

Optionally, the target position may be a manually selected target position, or a target position automatically selected by the intelligent robot. For example, the target position may be obtained by using a method of establishing a three-dimensional coordinate system. As shown in FIG. 3, the intelligent robot B is a tank, and a current position of the tank B is used as an origin to establish a three-dimensional coordinate system. A(20, 5, 0) in the three-dimensional coordinate system is selected as the target position. The foregoing description is merely an example, and does not constitute any limitation on the present disclosure.

Optionally, the movement path may include a straight line or a continuous curve.

Optionally, the distance between the current position of the intelligent robot and the particular roadblock to be reached is a length of the movement path of the intelligent robot.

Optionally, before the intelligent robot is controlled to transmit a removal request, the following are further included: obtaining, by the intelligent robot, a movement speed of the intelligent robot and a control removal time matching the particular roadblock, the control removal time being used for indicating a time used for removing the particular roadblock before the intelligent robot arrives; and obtaining the target distance according to the movement speed and the control removal time.

Optionally, after obtaining the time used for removing the particular roadblock, the intelligent robot obtains the target distance according to a product of the movement speed of the intelligent robot and the time used for removing the particular roadblock.

Optionally, in order that the particular roadblock is removed when the intelligent robot reaches the particular roadblock, after the target distance is obtained, a fluctuation value is added to the target distance to obtain a new target distance, and the target distance is used to instruct the intelligent robot to transmit the removal request. In this way, the particular roadblock is removed before the intelligent robot reaches the particular roadblock. The fluctuation value is a positive number, and a specific value may be set according to an actual situation.

Optionally, the movement speed of the intelligent robot is not uniform, an average speed of the intelligent robot within a period of time is selected as the movement speed.

Optionally, whether the movement path includes the particular roadblock may be determined in the following manner:

If an intersection exists between the movement path and an identifier of a particular roadblock on a map, the movement path includes the particular roadblock. If no intersection exists between the movement path and an identifier of a particular roadblock on a map, the movement path does not include the particular roadblock.

Optionally, the control removal time may be a time period from receipt of the removal request to completion of removal.

Optionally, that the intelligent robot transmits the removal request to the Internet-of-Things includes: determining a roadblock type of the particular roadblock, transmitting, by the intelligent robot, the removal request to the control server in the Internet-of-Things according to the roadblock type of the particular roadblock, and transmitting, by the control server in the Internet-of-Things, a removal instruction matching the roadblock type of the particular roadblock to the particular roadblock according to the roadblock type, to remove the particular roadblock, and transmitting a removal response to the intelligent robot.

Optionally, the removal response includes a removal result of the particular roadblock. After receiving the removal result, the intelligent robot may adjust a to-be-executed action according to the removal result.

Optionally, the removal result may be that the particular roadblock has been removed, or that the particular roadblock is not removed. When the particular roadblock has been removed, the control server may control the intelligent robot to continue moving according to the movement path. When the particular roadblock is not removed, the control server may control the intelligent robot to pause movement and wait or update the movement path. The updated movement path bypasses the particular roadblock that cannot be removed.

Optionally, the intelligent robot alarms after receiving the removal result of the particular roadblock that is not removed.

Optionally, the type of the particular roadblock may include a first type and a second type. When the roadblock type is the first type, the control server transmits a first removal instruction to the particular roadblock whose roadblock type is the first type, the first removal instruction being used for causing the particular roadblock to open. When the roadblock type is the second type, the control server transmits a second removal instruction to the particular roadblock whose roadblock type is the second type, the second removal instruction being used for causing the particular roadblock whose roadblock type is the second type to move, within a predetermined time period, to a first floor on which the intelligent robot is located.

Optionally, before the intelligent robot determines, according to the target position and the current position of the intelligent robot, the movement path on which the intelligent robot moves to the target position, the following steps are further included: obtaining, by the intelligent robot, environment scanning data of the current position of the intelligent robot through laser scanning; transmitting, by the intelligent robot, the environment scanning data of the current position to the control server, and comparing, by the control server, the environment scanning data with an environment map; and determining, according to a comparison result, the current position of the intelligent robot, and then transmitting the current position of the intelligent robot to the intelligent robot or storing the current position of the intelligent robot.

Optionally, a three-dimensional coordinate system may be set according to the environment map. In this case, each position on the environment map has corresponding coordinates the three-dimensional coordinate system.

In one embodiment of the present disclosure, the control server obtains the removal request transmitted by the intelligent robot, the intelligent robot moving from the first position to the target position according to the movement path, and the removal request is triggered in a case that the intelligent robot moves from the first position to the second position, and the distance between the second position and the third position at which the particular roadblock is located and that is to be reached by the intelligent robot reaches the target distance; and after obtaining the removal request transmitted by the intelligent robot, the control server transmits the removal instruction to the particular roadblock at the third position according to the removal request, so that the intelligent robot is prevented from waiting in front of the particular roadblock, thereby improving efficiency in controlling the intelligent robot.

In one embodiment, the transmitting, by the control server, a removal instruction to the particular roadblock at the third position according to the removal request includes the followings.

S1. The control server obtains a roadblock type of the particular roadblock at the third position that is carried in the removal request.

S2. The control server transmits the removal instruction matching the roadblock type to the particular roadblock at the third position.

Optionally, the roadblock type of the particular roadblock may be preset to, for example, the first type or the second type.

Details are described with reference to FIG. 4. As shown in FIG. 4, which includes an electronic door A, an electronic door B, and an elevator, the electronic door A and the electronic door B may be of the first type, and the elevator may be of the second type. After detecting the electronic door A, the electronic door B, and the elevator on the movement path during movement, the intelligent robot B transmits a removal request to the control server. Then, the control server transmits removal instructions matching the types of the particular roadblocks according to the types of the particular roadblocks. for example, a first removal instruction used for opening an electronic door, and a second removal instruction used for opening an elevator.

The first removal instruction used for opening an electronic door and the second removal instruction used for opening an elevator are merely an example, which is not specifically limited in one embodiment.

In one embodiment, different removal instructions are set according to types of particular roadblocks, so that a time for removing a particular roadblock is more accurate, thereby avoiding a problem of inaccurate time for removing a particular roadblock due to a case that types of particular roadblocks are different but removal instructions are the same.

In one embodiment, the transmitting, by the control server, the removal instruction matching the roadblock type to the particular roadblock at the third position includes the following steps:

S1. The control server transmits a first removal instruction to the particular roadblock at the third position in a case that the roadblock type is indicated as a first type, the first removal instruction being used for instructing the particular roadblock at the third position to execute an open action.

S2. The control server transmits a second removal instruction to the particular roadblock at the third position in a case that the roadblock type is indicated as a second type, the second removal instruction being used for instructing the particular roadblock at the third position to move, within a predetermined time period, to a first floor on which the intelligent robot is located.

For example, descriptions are still provided with reference to FIG. 4. As shown in FIG. 4, when the roadblock type of the particular roadblock is an electronic door, the control server transmits the first removal instruction that causes the electronic door to open. When the roadblock type of the particular roadblock is an elevator, the control server transmits the second removal instruction, to instruct the elevator to move to a first floor on which the intelligent robot is located, and open a door of the elevator.

In one embodiment of the present disclosure, different types of particular roadblocks are removed by using different removal instructions, so that efficiency in removing a particular roadblock is improved, thereby improving efficiency in controlling the intelligent robot.

In one embodiment, after the transmitting, by the control server, a second removal instruction to the particular roadblock at the third position, or during the transmitting a second removal instruction to the particular roadblock at the third position, the following steps are further included:

S1. The control server obtains an inter-floor movement instruction transmitted by the intelligent robot, and the inter-floor movement instruction may be used for indicating a second floor to be reached by the intelligent robot.

S2. The control server returns an inter-floor movement response to the intelligent robot after the particular roadblock at the third position moves to the second floor, the inter-floor movement response being used for instructing the intelligent robot to continue moving on the second floor according to the movement path.

For example, descriptions are provided with reference to FIG. 4 and FIG. 6. As shown in FIG. 4, the intelligent robot is located on the first floor. After the intelligent robot moves to the elevator, the intelligent robot takes the elevator to reach a second floor, as shown in FIG. 6. After reaching the second floor, the intelligent robot obtains an inter-floor movement response of the control server. After the inter-floor movement response is obtained, the intelligent robot is controlled according to the inter-floor movement response to continue moving to the target position A on the second floor.

In one embodiment, an inter-floor movement instruction is transmitted to the control server, so that after passing through the particular roadblock of the second type, the intelligent robot may continue moving to the target position, thereby avoiding a problem that the intelligent robot cannot continue moving to the target position after losing the target position.

Figure 12:
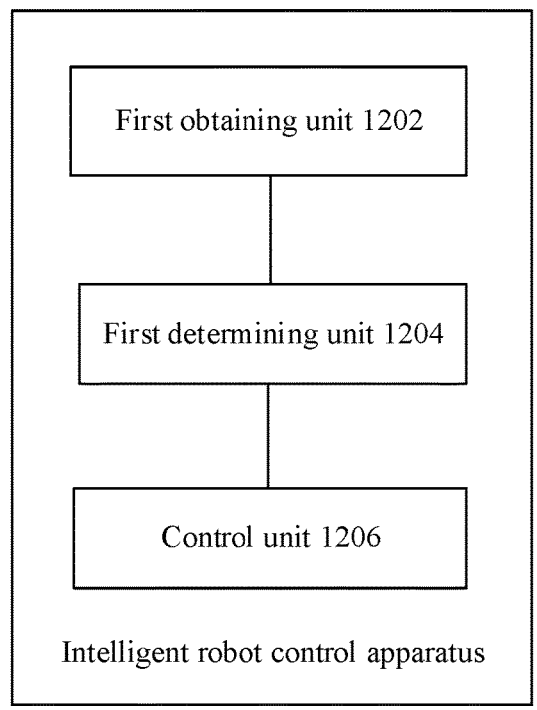
FIG. 12 is a schematic structural diagram of an intelligent robot control apparatus according to an embodiment of the present disclosure.

According to another aspect of the embodiments of the present disclosure, an intelligent robot control apparatus configured to implement the intelligent robot control method is further provided, applied to an intelligent robot. As shown in FIG. 12, the apparatus includes:

(1) a first obtaining unit 1202, configured to obtain a first position at which the intelligent robot is currently located and a target position to be reached;

(2) a first determining unit 1204, configured to determine a movement path on which the intelligent robot moves from the first position to the target position, the movement path including a particular roadblock; and (3) a control unit 1206, configured to control the intelligent robot to transmit a removal request, in a case that the intelligent robot moves from the first position to a second position, and a distance between the second position and a third position at which the particular roadblock is located and that is to be reached reaches a target distance, the removal request being used for requesting the particular roadblock at the third position to transmit a removal instruction, and the removal instruction being used for instructing to remove the particular roadblock at the third position before the intelligent robot arrives.

The intelligent robot control apparatus may be a control module disposed inside the intelligent robot, or a control device disposed outside the intelligent robot. The control device disposed outside the intelligent robot and the intelligent robot may have the following connection relationship: a physically wired connection to the intelligent robot, or a wireless communication connection to the intelligent robot through near field communication or a wireless network.

Optionally, the intelligent robot control apparatus may be applied to a scenario of controlling an intelligent robot to patrol an area, or using an intelligent robot to deliver goods.

Optionally, the intelligent robot control apparatus may be applied to an Internet-of-Things control system. In the Internet-of-Things control system, the intelligent robot control apparatus is an intelligent robot. The Internet-of-Things control system includes: the intelligent robot, a particular roadblock, and a control server configured to control removal of the particular roadblock. The Internet-of-Things control system may be a control subnetwork included in the Internet-of-Things. The Internet-of-Things may be an information carrier such as the Internet or a conventional telecommunications network, or a network enabling all ordinary objects that can perform independent functions to achieve interconnection. In other words, the intelligent robot, the particular roadblock, and the control server described in one embodiment are equivalent to some objects included in the Internet-of-Things.

For example, in a patrol scenario, the particular roadblock may be a controllable electronic door. In the present disclosure scenario, the intelligent robot obtains, from the control server, a target position to be reached by the intelligent robot, and determines a movement path according to a position at which the intelligent robot is currently located. When the movement path includes the electronic door, the intelligent robot transmits a removal request to the control server when a distance from the intelligent robot to the particular roadblock reaches a target distance, to request to control the electronic door to open. When the intelligent robot reaches the electronic door, the electronic door is open, and the intelligent robot may pass through the electronic door without staying.

In one embodiment, a first position at which the intelligent robot is currently located and a target position to be reached are obtained, and a movement path of the intelligent robot is determined, the movement path including a particular roadblock. In addition, after the movement path is determined, a distance between the intelligent robot and the particular roadblock on the movement path is detected, and a removal request is transmitted in advance in a case that the distance between the intelligent robot and the particular roadblock reaches a target distance, to remove the particular roadblock, so that the intelligent robot may directly pass through the removed particular roadblock on the movement path without needing to spend time waiting when the intelligent robot reaches the particular roadblock, thereby improving efficiency in controlling the intelligent robot by reducing a time taken by the intelligent robot to pass through the particular roadblock.

Optionally, the intelligent robot may include an intelligent robot that can move, such as a flying robot or a land robot.

Optionally, the target position may be a manually selected target position, or a target position automatically selected by the intelligent robot. For example, the target position may be obtained by using a method of establishing a three-dimensional coordinate system. As shown in FIG. 3, the intelligent robot B is a tank, and a current position of the tank B is used as an origin to establish a three-dimensional coordinate system. A(20, 5, 0) in the three-dimensional coordinate system is selected as the target position. The foregoing description is merely an example, and does not constitute any limitation on the present disclosure.

Optionally, the movement path may include a straight line or a continuous curve.

Optionally, the distance between the current position of the intelligent robot and the particular roadblock to be reached is a length of the movement path of the intelligent robot.

Optionally, the control unit further includes: a determining module, configured to determine a roadblock type of the particular roadblock at the third position; and a sending module, configured to transmit the removal request to a control server in the Internet-of-Things, the removal request carrying the roadblock type, and the control server being configured to transmit the removal instruction matching the roadblock type to the particular roadblock at the third position according to the removal request.

Optionally, the control unit further includes: a first obtaining module, configured to obtain, after the removal request is transmitted to the control server in the Internet-of-Things, a removal response transmitted by the control server, the removal response being used for indicating a removal result of the particular roadblock at the third position; and an adjustment module, configured to adjust a to-be-executed action of the intelligent robot according to the removal result.

Optionally, the adjustment module includes: a first control submodule, configured to control, in a case that the removal result indicates that the particular roadblock at the third position has been removed, the intelligent robot to continue moving according to the movement path, to pass through the particular roadblock at the third position; and a second control submodule, configured to control, in a case that the removal result indicates that the particular roadblock at the third position is not removed, the intelligent robot to execute at least one of the following actions: the intelligent robot being controlled to pause movement, and transmit the removal request to the control server; and the intelligent robot being controlled to update the movement path, the updated movement path by passing the particular roadblock at the third position.

Optionally, the control module further includes: a second obtaining module, configured to obtain a control removal time matching the particular roadblock at the third position before the intelligent robot is controlled to transmit the removal request to the Internet-of-Things, the control removal time including a time for removing the particular roadblock at the third position before the intelligent robot arrives; and a second determining module, configured to determine the target distance according to the control removal time.

Optionally, the second determining module includes: a third obtaining submodule, configured to obtain a movement speed of the intelligent robot and the control removal time; and a determining submodule, configured to determine the target distance according to a product of the movement speed and the control removal time.

Optionally, the apparatus further includes a second determining unit, configured to determine that the movement path includes the particular roadblock, after it is determined the movement path on which the intelligent robot moves from the first position to the target position, and in a case that an intersection exists between the movement path and a roadblock identifier of a particular roadblock that is included on a map.

Optionally, the obtaining unit includes: a third obtaining module, configured to obtain, through laser scanning, environment scanning data of the intelligent robot at the first position; and a third determining module, configured to determine the first position according to the environment scanning data.

In one embodiment of the present disclosure, the target position to be reached by the intelligent robot and the first position of the intelligent robot are obtained, to determine the movement path on which the intelligent robot moves to the target position, the distance for the intelligent robot to reach the particular roadblock on the movement path is obtained, and when the distance reaches the target distance, the intelligent robot is controlled to transmit the removal request, to remove the particular roadblock, so that the intelligent robot is prevented from waiting in front of the particular roadblock, thereby improving efficiency in controlling the intelligent robot.

Figure 13:
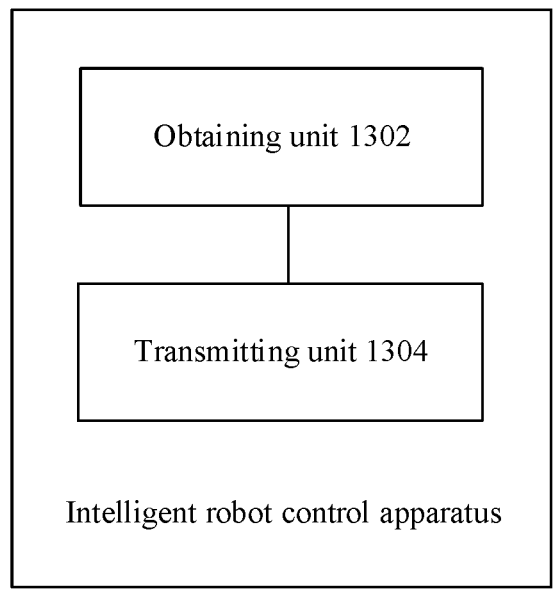
FIG. 13 is a schematic structural diagram of another intelligent robot control apparatus according to an embodiment of the present disclosure.

According to still another aspect of the embodiments of the present disclosure, an intelligent robot control apparatus configured to implement the intelligent robot control method is further provided, applied to a control server. Optionally, in one embodiment, in an optional implementation, as shown in FIG. 13, the intelligent robot control apparatus may include:

(1) an obtaining unit 1302, configured to obtain a removal request transmitted by an intelligent robot, the intelligent robot moving from a first position to a target position according to a movement path; and trigger the removal request in a case that the intelligent robot moves from the first position to a second position, and a distance between the second position and a third position at which a particular roadblock is located and that is to be reached by the intelligent robot reaches a target distance; and (2) a transmitting unit 1304, configured to transmit a removal instruction to the particular roadblock at the third position according to the removal request, the removal instruction being used for instructing to remove the particular roadblock at the third position before the intelligent robot arrives.

The intelligent robot control apparatus may be a server having a calculation function, or a control device capable of transmitting the removal instruction to the particular roadblock. The server or the control apparatus interacts with the intelligent robot or the particular roadblock through a network. Optionally, the intelligent robot control apparatus may be applied to a scenario of controlling an intelligent robot to patrol an area, or using an intelligent robot to deliver goods. Optionally, the intelligent robot control apparatus may be applied to an Internet-of-Things control system. In the Internet-of-Things control system, the intelligent robot control apparatus is an intelligent robot. The Internet-of-Things control system includes: the intelligent robot, a particular roadblock, and a control server configured to control removal of the particular roadblock. The Internet-of-Things control system may be a control subnetwork included in the Internet-of-Things. The Internet-of-Things may be an information carrier such as the Internet or a conventional telecommunications network, or a network enabling all ordinary objects that can perform independent functions to achieve interconnection. In other words, the intelligent robot, the particular roadblock, and the control server described in one embodiment are equivalent to some objects included in the Internet-of-Things.

For example, in a patrol scenario, the particular roadblock may be a controllable electronic door. In the present disclosure scenario, the intelligent robot obtains, from the control server, a target position to be reached by the intelligent robot, and determines a movement path according to a position at which the intelligent robot is currently located. When the movement path includes the electronic door, the intelligent robot transmits a removal request to the control server when a distance from the intelligent robot to the particular roadblock reaches a target distance, to request to control the electronic door to open. When the intelligent robot reaches the electronic door, the electronic door is open, and the intelligent robot may pass through the electronic door without staying.

In one embodiment, the removal request transmitted by the intelligent robot is obtained, the intelligent robot moving from the first position to the target position according to the movement path, and the removal request is triggered in a case that the intelligent robot moves from the first position to the second position, and the distance between the second position and the third position at which the particular roadblock is located and that is to be reached reaches the target distance; and the removal instruction is transmitted to the particular roadblock at the third position according to the removal request, the removal instruction being used for instructing to remove the particular roadblock at the third position before the intelligent robot arrives, so that the intelligent robot may directly pass through the removed particular roadblock on the movement path without needing to spend time waiting when the intelligent robot reaches the particular roadblock, thereby improving efficiency in controlling the intelligent robot by reducing a time taken by the intelligent robot to pass through the particular roadblock.

Optionally, the intelligent robot may include an intelligent robot that can move, such as a flying robot or a land robot.

Optionally, the target position may be a manually selected target position, or a target position automatically selected by the intelligent robot. For example, the target position may be obtained by using a method of establishing a three-dimensional coordinate system. As shown in FIG. 3, the intelligent robot B is a tank, and a current position of the tank B is used as an origin to establish a three-dimensional coordinate system. A(20, 5, 0) in the three-dimensional coordinate system is selected as the target position. The foregoing description is merely an example, and does not constitute any limitation on the present disclosure.

Optionally, the movement path may include a straight line or a continuous curve.

Optionally, the distance between the current position of the intelligent robot and the particular roadblock to be reached is a length of the movement path of the intelligent robot.

Optionally, the transmitting unit includes: an obtaining module, configured to obtain a roadblock type of the particular roadblock at the third position that is carried in the removal request; and a sending module, configured to transmit the removal instruction matching the roadblock type to the particular roadblock at the third position.

Optionally, the sending module includes: a first sending submodule, configured to transmit a first removal instruction to the particular roadblock at the third position in a case that the roadblock type is indicated as a first type, the first removal instruction being used for instructing the particular roadblock at the third position to execute an open action; and a second sending submodule, configured to transmit a second removal instruction to the particular roadblock at the third position in a case that the roadblock type is indicated as a second type, the second removal instruction being used for instructing the particular roadblock at the third position to move, within a predetermined time period, to a first floor on which the intelligent robot is located.

Optionally, the second sending submodule is further configured to obtain, after transmitting the second removal instruction to the particular roadblock at the third position, or during transmitting the second removal instruction to the particular roadblock at the third position, an inter-floor movement instruction transmitted by the intelligent robot, the inter-floor movement instruction being used for indicating a second floor to be reached by the intelligent robot; and return an inter-floor movement response to the intelligent robot after the particular roadblock at the third position moves to the second floor, the inter-floor movement response being used for instructing the intelligent robot to continue moving on the second floor according to the movement path.

In one embodiment of the present disclosure, the control server obtains the removal request transmitted by the intelligent robot, the intelligent robot moving from the first position to the target position according to the movement path, and the removal request is triggered in a case that the intelligent robot moves from the first position to the second position, and the distance between the second position and the third position at which the particular roadblock is located and that is to be reached by the intelligent robot reaches the target distance; and after obtaining the removal request transmitted by the intelligent robot, the control server transmits the removal instruction to the particular roadblock at the third position according to the removal request, so that the intelligent robot is prevented from waiting in front of the particular roadblock, thereby improving efficiency in controlling the intelligent robot.

Figure 14:
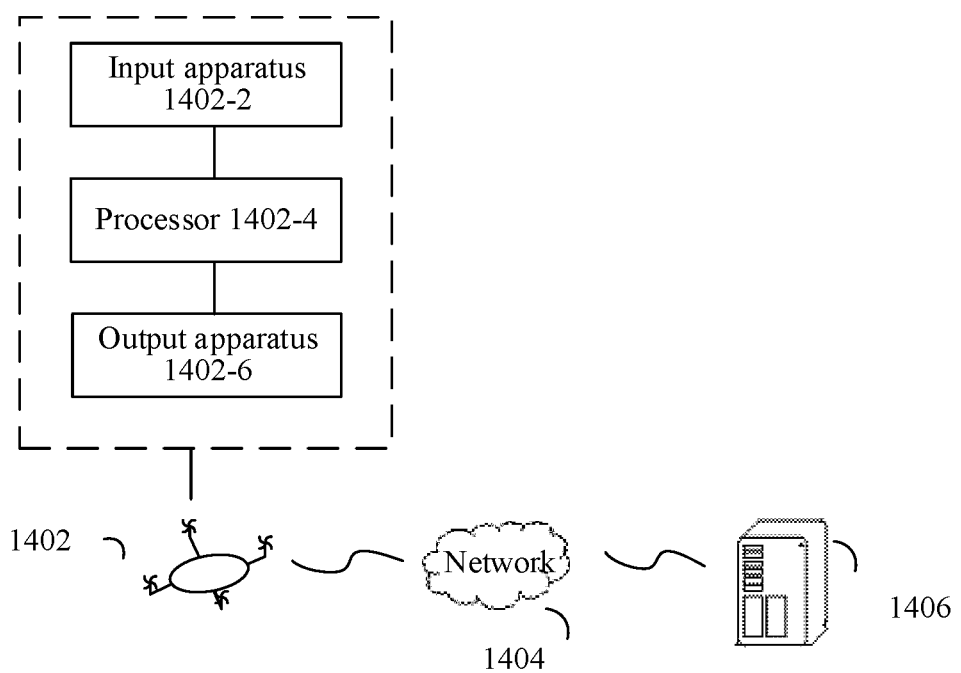
FIG. 14 is a schematic structural diagram of an intelligent robot control system according to an embodiment of the present disclosure.

According to still another aspect of the embodiments of the present disclosure, an intelligent robot control system configured to implement the intelligent robot control method is further provided. Optionally, in one embodiment, in an optional implementation, as shown in FIG. 14, the intelligent robot control system may include:

(I) an intelligent robot 1402, the intelligent robot including an input apparatus 1402-2, a processor 1402-4, and an output apparatus 1402-6;

(1) the input apparatus 1402-2 being configured to obtain a first position at which the intelligent robot is currently located and a target position to be reached;

(2) the processor 1402-4 being configured to determine a movement path on which the intelligent robot moves from the first position to the target position, the movement path including a particular roadblock; and (3) the output apparatus 1402-6 being configured to transmit a removal request in a case that the intelligent robot moves from the first position to a second position, and a distance between the second position and a third position at which the particular roadblock is located and that is to be reached reaches a target distance, the removal request being used for requesting the particular roadblock at the third position to transmit a removal instruction, and the removal instruction being used for instructing to remove the particular roadblock at the third position before the intelligent robot arrives; and (II) a control server 1406, configured to transmit the removal instruction to the particular roadblock at the third position according to the removal request.

The intelligent robot control system may be applied to an Internet-of-Things control system. The Internet-of-Things control system may further include a particular roadblock. The control server 1406 is configured to control removal of the particular roadblock, so that the intelligent robot 1402 can smoothly pass through. The intelligent robot 1402 may communicate with the control server 1406 through a network 1404, but is not limited thereto. Optionally, in one embodiment, the network 1404 may include a wired network or a wireless network. A timing advance is reserved for a moving intelligent robot by remotely controlling removal of a particular roadblock, so that the intelligent robot may directly pass through the removed particular roadblock on a movement path without needing to spend time waiting when the intelligent robot reaches the particular roadblock, thereby reducing a time taken by the intelligent robot to pass through the particular roadblock.

Figure 15:
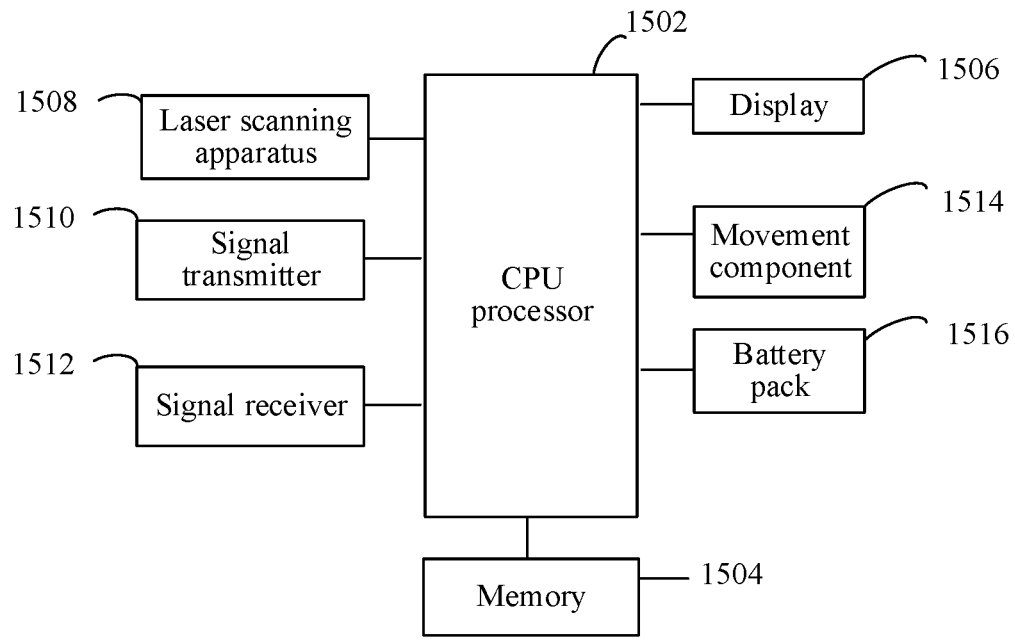
FIG. 15 is a schematic structural diagram of an intelligent robot according to an embodiment of the present disclosure.

For example, as shown in FIG. 15, the intelligent robot may further include, but is not limited to:

(1) the processor 1402-4, which may include a CPU 1502, configured to determine a movement path on which the intelligent robot moves from the first position to the target position, the movement path including a particular roadblock;

(2) a memory 1504, configured to store the particular roadblock and data of a scanned map;

(3) a display 1506, configured to display the movement path of the intelligent robot and a position of the particular roadblock;

(4) a laser scanning apparatus 1508, configured to scan a surrounding environment, to obtain the first position at which the intelligent robot is located;

(5) the output apparatus 1402-6, which may include a signal transmitter 1510, configured to transmit a removal request to the control server;

(6) the input apparatus 1402-2, which may include a signal receiver 1512, configured to receive a removal response returned by the control server;

(7) a movement component 1514, configured to control movement of the intelligent robot, where for example, the movement component 1514 may be a flying movement component, or the movement component 1514 may be a mobile caster, and the foregoing description is merely an example, and is not limited in one embodiment; and (8) a battery pack 1516, configured to supply power to components of the intelligent robot.

Figure 16:
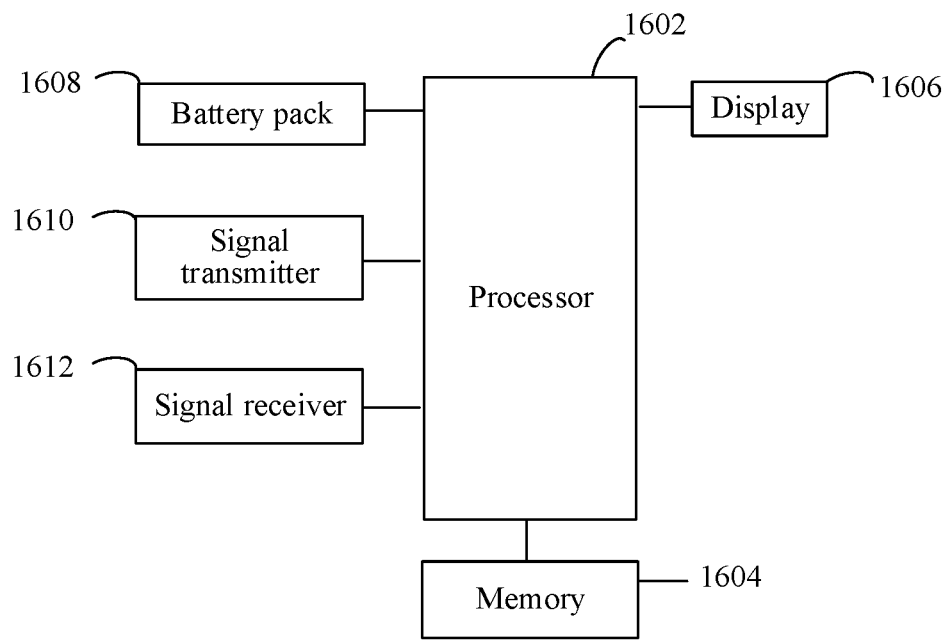
FIG. 16 is a schematic structural diagram of a control server according to an embodiment of the present disclosure.

For example, as shown in FIG. 16, the control server 1406 may include, but is not limited to:

(1) a processor 1602, configured to process a removal request transmitted by the intelligent robot;

(2) a memory 1604, configured to store a type of a particular roadblock and a removal instruction;

(3) a display 1606, configured to display a movement path of the intelligent robot and the particular roadblock;

(4) a battery pack 1608, configured to supply power to all parts of a control server;

(5) a signal transmitter 1610, configured to transmit a removal response to the intelligent robot; and (6) a signal receiver 1612, configured to receive the removal request transmitted by the intelligent robot.

Optionally, in one embodiment, the intelligent robot 1402 communicates with the control server 1406 through the network 1404, so that the control server 1406 remotely controls removal of the particular roadblock on the movement path of the intelligent robot 1402 in advance.

The foregoing communication process may be implemented by using a TCP/IP communication protocol. Assuming that the intelligent robot is used for performing an object delivery process, the communication process may include, but is not limited to the following steps:

(I) The intelligent robot reports a robot status in real time, which may include the following instructions:

(1) Report an identifier (ID) of the intelligent robot that is to be controlled to move. For example, the ID of the intelligent robot that is registered with the control server may be learned of by using a field ""Robot_ID": 1700004263".

(2) Obtain a data ID of the intelligent robot that is registered with the control server. For example, the registered data ID may be learned of by using a field "MSG_ID": 100004529".

(3) Report a current coordinate type and a current coordinate position of the intelligent robot. For example, it may be learned by using a field "SRS, 1" that the current coordinate type used by the intelligent robot is a longitude and latitude. For example, a longitude and latitude indicated by the current coordinate position of the intelligent robot may be learned of by using a field "Robot_Pose". Accuracy of the longitude and latitude may be set to different values according to specific scenarios. For example, the accuracy may be set to accurate to six decimal places. For example, the current coordinate position of the intelligent robot is "113.934391, 22.540338".

(4) Report a current travel status of the intelligent robot, where the current travel status may include, but is not limited to: a travel speed, a percentage of a remaining electricity quantity, a current first position, and information of a task performed. For example, the movement speed of the intelligent robot, for example, "0.4 m/s", may be learned of by using a field "Robot_Velocity". For example, the percentage of the remaining electricity quantity of the intelligent robot, for example, "87%", may be learned of by using a field "Robot_Power". For example, the current first position of the intelligent robot may be learned of by using a field "Current_Floor". For example, "dsj_11f" indicates that the current floor is floor 11 at level 3. For example, a name of a recipient, for example, "Jack", included in the information about the task performed by the intelligent robot by be learned of by using a field "Goal_Name". For example, a target position, for example, "113.934384, 22.540348", included in the information about the task performed by the intelligent robot by be learned of by using a field "Goal_Pose". For example, a delivery status (or referred to as a movement state) included in the information about the task performed by the intelligent robot may be learned of by using a field "Task_Status". For example, "0" indicates delivery in progress (moving); "1" indicates delivery completed; "2" indicates delivery failed; "3" indicates task completed (all completed); "4" indicates waiting for box to be open; "5" indicates object removed; and "6" indicates removal completed (box closed).

(5) Report a fault status of the intelligent robot. A specific fault type of the intelligent robot when a fault occurs is reported by using a field "Robot_Status". For example, "0" indicates that the intelligent robot is normal; "1" indicates that the intelligent robot is stuck; "2" indicates that the intelligent robot collides; "3" indicates that box opening fails; and "4" indicates that the intelligent robot is charging.

(II) The intelligent robot receives a control instruction transmitted by the control server, which may include the following instructions:

In a process of sending the control instruction to the intelligent robot, the control server also needs to confirm identifiers in (1)-(2), to ensure that the control instruction to be sent is sent to the correct intelligent robot to be controlled.

In addition, the information about the task to be performed by the intelligent robot may be notified by using a field "Goals", including a target position to be reached that is indicated by a field "Floor". For example, "dsj_11f" indicates that the current floor is floor 11 at level 3. A filed "Type" indicates a task type of a task to be performed at the target position. For example, "G" indicates that the target position is an express delivery point, at which a box opening operation needs to be matched. "W" indicates that the target position is a path point, which is used only as a navigation stop. "D" indicates that the target position is an entrance guard point, at which a door opening operation needs to be matched. "L" indicates that the target position is an elevator, at which an elevator door opening operation needs to be matched. "M" indicates that the target position is a map switching point, at which map switching is needed. "T" indicates that the target position is a temporary point, where the task needs to be suspended when the temporary point occurs, and the task continues after the temporary point is reached. "A" indicates that the target position is a highest authority point, where the current task needs to be quit when the highest authority point occurs, and a highest authority point task needs to be preferentially performed.

Optionally, the coordinate position may be indicated by a field "Pose", which is not described in detail herein.

(3) The intelligent robot transmits the removal request, which may include the following instructions:

For example, a dynamic password is reported by using a field "token", for login. For example, a device din is reported by using a field "din". For example, a function ID applied to the control server in the Internet-of-Things control system is indicated by using a field "datapoint". A message is transmitted by using a field "cmd". Transmission of "cmd" is implemented by using the following combination: type+ "_id"+"_cmd". Herein, the field "type" is used for indicating the roadblock type of the particular roadblock. For example, "door" indicates an entrance guard. The field "id" is an identifier sequence number of the particular roadblock. "cmd" is a command to be executed on a particular roadblock corresponding to "id". For example, a command "door_001_01" is used for instructing to open an entrance guard whose entrance guard sequence number is 001, and a command "door_001_00" is used for instructing to close the entrance guard whose entrance guard sequence number is 001.

The foregoing description is merely an example of the task to be performed by the intelligent robot in the Internet-of-Things control system, which is not limited in one embodiment.

According to still another aspect of the embodiments of the present disclosure, a storage medium is further provided, storing a computer program, the computer program being configured to perform, during running, the steps in any one of the foregoing method embodiments.

Optionally, in one embodiment, the storage medium may be configured to store the computer program used for performing the following steps:

S1. Obtain a first position at which an intelligent robot is currently located and a target position to be reached.

S2. Determine a movement path on which the intelligent robot moves from the first position to the target position, the movement path including a particular roadblock.

S3. The intelligent robot transmits a removal request in a case that the intelligent robot moves from the first position to a second position, and a distance between the second position and a third position at which the particular roadblock is located and that is to be reached reaches a target distance, the removal request being used for requesting the particular roadblock at the third position to transmit a removal instruction, and the removal instruction being used for instructing to remove the particular roadblock at the third position before the intelligent robot arrives.

Optionally, the storage medium is further configured to store computer program code used for performing the following steps:

S1. Determine a roadblock type of the particular roadblock at the third position.

S2. Transmit the removal request to a control server, the removal request carrying the roadblock type, and the control server being configured to transmit the removal instruction matching the roadblock type to the particular roadblock at the third position according to the removal request.

Optionally, the storage medium is further configured to store computer program code used for performing the following steps:

S1. Obtain a removal response transmitted by the control server, the removal response being used for indicating a removal result of the particular roadblock at the third position.

S2. Adjust a to-be-executed action of the intelligent robot according to the removal result.

Optionally, the storage medium is further configured to store computer program code used for performing the following steps:

S1. Control the intelligent robot to continue moving according to the movement path, and pass through the particular roadblock at the third position, in a case that the removal result indicates that the particular roadblock at the third position has been removed.

S2. Control the intelligent robot to execute at least one of the following actions in a case that the removal result indicates that the particular roadblock at the third position is not removed: the intelligent robot pausing movement, and retransmitting the removal request to the control server; and the intelligent robot updating the movement path, the updated movement path bypassing the particular roadblock at the third position.

Optionally, the storage medium is further configured to store computer program code used for performing the following steps:

S1. The control server transmits a first removal instruction to the particular roadblock at the third position in a case that the roadblock type is indicated as a first type, the first removal instruction being used for instructing the particular roadblock at the third position to execute an open action.

S2. The control server transmits a second removal instruction to the particular roadblock at the third position in a case that the roadblock type is indicated as a second type, the second removal instruction being used for instructing the particular roadblock at the third position to move, within a predetermined time period, to a first floor on which the intelligent robot is located.

Optionally, the storage medium is further configured to store computer program code used for performing the following steps:

S1. Transmit an inter-floor movement instruction to the control server, the inter-floor movement instruction being used for indicating a second floor to be reached by the intelligent robot.

S2. Obtain, after the particular roadblock at the third position moves to the to second floor, an inter-floor movement response returned by the control server, the inter-floor movement response being used for instructing the intelligent robot to continue moving on the second floor according to the movement path.

Optionally, the storage medium is further configured to store computer program code used for performing the following steps:

S1. Obtain a control removal time matching the particular roadblock at the third position, the control removal time including a time for removing the particular roadblock at the third position before the intelligent robot arrives.

S2. Determine the target distance according to the control removal time.

Optionally, the storage medium is further configured to store computer program code used for performing the following steps:

S1. Obtain a movement speed of the intelligent robot and the control removal time.

S2. Determine the target distance according to a product of the movement speed and the control removal time.

Optionally, the storage medium is further configured to store computer program code used for performing the following steps:

S1. Determine, in a case that an intersection exists between the movement path and a roadblock identifier of a particular roadblock that is included on a map, that the movement path includes the particular roadblock.

Optionally, the storage medium is further configured to store computer program code used for performing the following steps:

S1. Obtain, through laser scanning, environment scanning data of the intelligent robot at the first position.

S2. Determine the first position according to the environment scanning data.

Optionally, the storage medium is further configured to store computer program code used for performing the following steps:

S1. Obtain a removal request transmitted by an intelligent robot, the intelligent robot moving from a first position to a target position according to a movement path; and trigger the removal request in a case that the intelligent robot moves from the first position to a second position, and a distance between the second position and a third position at which a particular roadblock is located and that is to be reached by the intelligent robot reaches a target distance.

S2. Transmit a removal instruction to the particular roadblock at the third position according to the removal request, the removal instruction being used for instructing to remove the particular roadblock at the third position before the intelligent robot arrives.

Optionally, the storage medium is further configured to store computer program code used for performing the following steps:

S1. Obtain a roadblock type of the particular roadblock at the third position that is carried in the removal request.

S2. Transmit the removal instruction matching the roadblock type to the particular roadblock at the third position.

Optionally, the storage medium is further configured to store computer program code used for performing the following steps:

S1. Transmit a first removal instruction to the particular roadblock at the third position in a case that the roadblock type is indicated as a first type, the first removal instruction being used for instructing the particular roadblock at the third position to execute an open action.

S2. Transmit a second removal instruction to the particular roadblock at the third position in a case that the roadblock type is indicated as a second type, the second removal instruction being used for instructing the particular roadblock at the third position to move, within a predetermined time period, to a first floor on which the intelligent robot is located.

Optionally, the storage medium is further configured to store computer program code used for performing the following steps:

S1. Obtain an inter-floor movement instruction transmitted by the intelligent robot, the inter-floor movement instruction being used for indicating a second floor to be reached by the intelligent robot.

S2. Return an inter-floor movement response to the intelligent robot after the particular roadblock at the third position moves to the second floor, the inter-floor movement response being used for instructing the intelligent robot to continue moving on the second floor according to the movement path.

Optionally, the storage medium is further configured to store the computer program used for performing the steps included in the method in the foregoing embodiments. This is not described in detail in one embodiment.

Optionally, in one embodiment, a person of ordinary skill in the art may understand that all or some of the steps in the methods of the foregoing embodiments may be implemented by a program instructing relevant hardware of the terminal device. The program may be stored in a computer-readable storage medium. The storage medium may be a flash disk, a read-only memory (ROM), a random access memory (RAM), a magnetic disk, or an optical disc.

The sequence numbers of the foregoing embodiments of the present disclosure are merely for description purpose and do not indicate the preference of the embodiments.

When an integrated unit in the foregoing embodiment is implemented in a form of a software functional module and sold or used as an independent product, the integrated unit may be stored in the foregoing computer-readable storage medium. Based on such an understanding, the technical solutions of the present disclosure essentially, or the part contributing to the related art, or all or some of the technical solutions may be represented in a form of a software product. The computer software product is stored in a storage medium, and contains several instructions for instructing one or more computer devices (which may be a personal computer, a server, or a network device) to perform all or some of the steps of the methods in the embodiments of the present disclosure.

In the foregoing embodiments of the present disclosure, the descriptions of the embodiments have different emphases, and as for parts that are not described in detail in one embodiment, reference may be made to the relevant description of the other embodiments.

In the several embodiments provided in the present disclosure, it is to be understood that the disclosed client may be implemented in other manners. The described apparatus embodiments are merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electrical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

The foregoing descriptions are merely optional implementations of the present disclosure, and a person of ordinary skill in the art may make various improvements and refinements without departing from the principle of the present disclosure. All such improvements and refinements are also to be considered as falling within the protection scope of the present disclosure.

INDUSTRIAL APPLICABILITY

In the present disclosure, a first position at which an intelligent robot is currently located and a target position to be reached are obtained, and a movement path of the intelligent robot is determined, the movement path including a particular roadblock. In other words, in a case that a distance from the intelligent robot to the corresponding particular roadblock is a target distance, the intelligent robot transmits in advance a removal request used for requesting to transmit a removal instruction to the particular roadblock, so that the intelligent robot may directly pass through the removed particular roadblock on the movement path without needing to spend time waiting when the intelligent robot reaches the particular roadblock, thereby improving efficiency in controlling the intelligent robot by reducing a time taken by the intelligent robot to pass through the particular roadblock.

What is claimed is:

1. An intelligent robot control method for an intelligent robot, comprising:
    obtaining, by the intelligent robot, a first position at which the intelligent robot is currently located and a target position to be reached by the intelligent robot;
    determining, by the intelligent robot, a movement path from the first position to the target position, a particular roadblock being located at a third position on the movement path between the first position and the target position, the movement path further includes a second position located between the first position and the third position; and
    transmitting, by the intelligent robot, a removal request when the intelligent robot moves from the first position to the second position, and a distance between the second position and the third position reaches a target distance, wherein the removal request is used for requesting a removal instruction to be transmitted to the particular roadblock at the third position, and the removal instruction is used for instructing to remove the particular roadblock before the intelligent robot arrives at the third position;
    adding, by the intelligent robot, a fluctuation value to the target distance to obtain a new target distance; and
    transmitting, by the intelligent robot, a new removal request when a distance between the second position and the third position reaches the new target distance.

2. The method according to claim 1, wherein the transmitting a removal request comprises:
    determining a roadblock type of the particular roadblock at the third position; and
    transmitting the removal request to a control server, wherein the removal request carries the roadblock type.

3. The method according to claim 2, further comprising:
    obtaining a removal response transmitted by the control server; and
    adjusting a to-be-executed action according to the removal result.

4. The method according to claim 3, wherein the adjusting a to-be-executed action according to the removal result comprises:
    in response to determining that the removal result indicates that the particular roadblock at the third position has been removed, continuing moving according to the movement path, and passing through the third position.

5. The method according to claim 1, wherein the obtaining a first position comprises:
    performing, by the intelligent robot, laser scanning to obtain environment scanning data of the intelligent robot at the first position; and
    determining the first position according to the environment scanning data.

6. The method according to claim 1, further comprising:
determining, by the intelligent robot, the target position by establishing a three-dimensional coordinate system, wherein the first position of the intelligent robot is used as an origin of the three-dimensional coordinate system, a point A (x,y,z) in the three-dimensional coordinate system is selected as the target position.

7. The method according to claim 1, wherein the movement path is determined by:
determining, by the intelligent robot, an intersection exists between the movement path and an identifier of the particular roadblock on a map.

8. The method according to claim 1, wherein the target distance is determined by:
obtaining, by the intelligent robot, a movement speed of the intelligent robot;
determining, by the intelligent robot, a control removal time during which the particular roadblock is removed; and
determining, by the intelligent robot, the target distance according to a product of the movement speed and the control removal time.

9. An intelligent robot control method, comprising:
obtaining, by a control server, a removal request transmitted by an intelligent robot, the intelligent robot moving from a first position to a target position according to a movement path, a particular roadblock being located at a third position on the movement path between the first position and the target position, the movement path further includes a second position located between the first position and the third position;
triggering the removal request in response to determining that the intelligent robot moves from the first position to the second position, and a distance between the second position and the third position at which the particular roadblock is located reaches a target distance; and
transmitting a removal instruction to the particular roadblock, the removal instruction being used for, instructing to remove the particular roadblock at the third position before the intelligent robot arrives at the third position;
adding, by the intelligent robot, a fluctuation value to the target distance to obtain a new target distance; and
transmitting, by the intelligent robot, a new removal request when a distance between the second position and the third position reaches the new target distance.

10. The method according to claim 9, wherein the transmitting a removal instruction to the particular roadblock comprises:
obtaining a roadblock type of the particular roadblock at the third position that is carried in the removal request; and
generating the removal instruction according to the roadblock type.

11. The method according to claim 10, wherein the transmitting the removal instruction comprises:
transmitting a first removal instruction to the particular roadblock at the third position, the first removal instruction being used for instructing the particular roadblock at the third position to execute an open action; or
transmitting a second removal instruction to the particular roadblock at the third position, the second removal instruction being used for instructing the particular roadblock at the third position to move, within a predetermined time period, to a floor on which the intelligent robot is located.

12. The method according to claim 11, wherein the floor is a first floor, and the method further comprises:
obtaining an inter-floor movement instruction transmitted by the intelligent robot, the inter-floor movement instruction being used for indicating a second floor to be reached by the intelligent robot.

13. An intelligent robot, comprising: a battery pack for supplying power to the intelligent robot; a memory for storing computer programs; and a processor coupled to the memory for executing the computer programs to perform:
obtaining a first position at which the intelligent robot is currently located and a target position to be reached by the intelligent robot;
determining a movement path from the first position to the target position, a particular roadblock being located at a third position on the movement path between the first position and the target position, the movement path further includes a second position located between the first position and the third position;
transmitting a removal request when the intelligent robot moves from the first position to the second position, and a distance between the second position and the third position reaches a target distance, wherein the removal request is used for requesting a removal instruction to be transmitted to the particular roadblock at the third position, and the removal instruction is used for instructing to remove the particular roadblock at the third position before the intelligent robot arrives at the third position;
adding, by the intelligent robot, a fluctuation value to the target distance to obtain a new target distance; and
transmitting, by the intelligent robot, a new removal request when a distance between the second position and the third position reaches the new target distance.

14. The intelligent robot according to claim 13, wherein the transmitting a removal request comprises:
determining a roadblock type of the particular roadblock at the third position; and
transmitting the removal request to a control server, wherein the removal request carries the roadblock type.

15. The intelligent robot according to claim 14, wherein the processor further performs:
obtaining a removal response transmitted by the control server; and
adjusting a to-be-executed action according to the removal result.

16. The intelligent robot according to claim 15, wherein the adjusting a to-be-executed action according to the removal result comprises:
in response to determining that the removal result indicates that the particular roadblock at the third position has been removed, continuing moving according to the movement path, and passing through the third position.

17. The intelligent robot according to claim 14, wherein the processor further performs:
transmitting, by the control server, a first removal instruction to the particular roadblock at the third position, the first removal instruction being used for instructing the particular roadblock at the third position to execute an open action; or
transmitting, by the control server, a second removal instruction to the particular roadblock at the third position, the second removal instruction being used for instructing the particular roadblock at the third position to move, within a predetermined time period, to a floor on which the intelligent robot is located.

\* \* \* \* \*